(12) United States Patent
Bronstein Bendayan

(10) Patent No.: US 10,201,757 B2
(45) Date of Patent: *Feb. 12, 2019

(54) ASSET TRANSFERS BETWEEN INTERACTIVE SOCIAL GAMES

(71) Applicant: Zynga Inc., San Francisco, CA (US)

(72) Inventor: Manuel Uris Bronstein Bendayan, Palo Alto, CA (US)

(73) Assignee: Zynga Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/647,913

(22) Filed: Jul. 12, 2017

(65) Prior Publication Data

US 2017/0304730 A1    Oct. 26, 2017

Related U.S. Application Data

(63) Continuation of application No. 15/158,369, filed on May 18, 2016, now Pat. No. 9,795,880, which is a
(Continued)

(51) Int. Cl.
*A63F 13/537* (2014.01)
*H04W 4/21* (2018.01)
(Continued)

(52) U.S. Cl.
CPC ............ *A63F 13/537* (2014.09); *A63F 13/12* (2013.01); *A63F 13/35* (2014.09); *A63F 13/46* (2014.09);
(Continued)

(58) Field of Classification Search
None
See application file for complete search history.

(56) References Cited

U.S. PATENT DOCUMENTS 5,592,375 A    1/1997 Salmon et al.
6,119,229 A    9/2000 Martinez et al.
(Continued)

FOREIGN PATENT DOCUMENTS

| JP | 2002078975 A | 3/2002 |
| JP | 2006158899 A | 6/2006 |
| WO | WO-2012067681 A1 | 5/2012 |

OTHER PUBLICATIONS

US 8,715,089, 04/2014, Kelly et al. (withdrawn)
(Continued)

*Primary Examiner* — Jason Yen
(74) *Attorney, Agent, or Firm* — Schwegman Lundberg & Woessner, P.A.

(57) ABSTRACT

A method and system to transfer assets between interactive social games is described. In some embodiments, the method generates a visual expression of a transfer mechanism in a first computer-implemented game. The method further generates the visual expression of the transfer mechanism in a second computer-implemented game. The transfer mechanism is capable of transferring an in-game asset from the first computer-implemented game to the second computer-implemented game. The method transfers the in-game asset from the first computer-implemented game to the second computer-implemented game using the transfer mechanism.

16 Claims, 9 Drawing Sheets

Related U.S. Application Data continuation of application No. 14/282,423, filed on May 20, 2014, now Pat. No. 9,387,403, which is a continuation of application No. 13/277,864, filed on Oct. 20, 2011, now Pat. No. 8,758,119.

(51) Int. Cl.

| | | |
|---|---|---|
| *A63F 13/30* | (2014.01) | |
| *H04L 29/06* | (2006.01) | |
| *A63F 13/46* | (2014.01) | |
| *A63F 13/35* | (2014.01) | |
| *A63F 13/79* | (2014.01) | |
| *H04L 29/08* | (2006.01) | |
| *A63F 13/47* | (2014.01) | |

(52) U.S. Cl.
CPC ............... *A63F 13/47* (2014.09); *A63F 13/79* (2014.09); *H04L 67/306* (2013.01); *H04L 67/38* (2013.01); *H04W 4/21* (2018.02)

(56) References Cited

U.S. PATENT DOCUMENTS

| | | | |
|---|---|---|---|
| 7,069,308 | B2 | 6/2006 | Abrams |
| 7,305,398 | B2 | 12/2007 | Teicher |
| 7,686,691 | B2 | 3/2010 | Van Luchene |
| 7,955,175 | B1 | 6/2011 | Holloway et al. |
| 8,133,116 | B1 | 3/2012 | Kelly et al. |
| 8,137,193 | B1 | 3/2012 | Kelly et al. |
| 8,137,194 | B1 | 3/2012 | Kelly et al. |
| 8,272,956 | B2 | 9/2012 | Kelly et al. |
| 8,328,643 | B1 | 12/2012 | Osvald et al. |
| 8,332,544 | B1 | 12/2012 | Ralls et al. |
| 8,425,323 | B2 | 4/2013 | Fiden et al. |
| 8,491,396 | B2 | 7/2013 | Kelly et al. |
| 8,758,119 | B1 | 6/2014 | Bronstein Bendayan |
| 9,387,403 | B2 | 7/2016 | Bronstein et al. |
| 9,795,880 | B2 | 10/2017 | Bronstein Bendayan |
| 2002/0090985 | A1 | 7/2002 | Tochner et al. |
| 2003/0046221 | A1 | 3/2003 | Hora |
| 2004/0259641 | A1 | 12/2004 | Ho |
| 2005/0143174 | A1 | 6/2005 | Goldman et al. |
| 2005/0272504 | A1* | 12/2005 | Eguchi .................. A63F 13/323 463/40 |
| 2006/0121990 | A1 | 6/2006 | O'Kelley, II et al. |
| 2006/0135264 | A1 | 6/2006 | Shaw et al. |
| 2006/0178180 | A1 | 8/2006 | Jung et al. |
| 2006/0190392 | A1 | 8/2006 | Samid |
| 2006/0205492 | A1 | 9/2006 | Linard et al. |
| 2006/0287105 | A1 | 12/2006 | Willis |
| 2007/0111770 | A1 | 5/2007 | Van Luchene |
| 2007/0117615 | A1 | 5/2007 | Van Luchene |
| 2007/0129126 | A1 | 6/2007 | Van Luchene |
| 2007/0129148 | A1 | 6/2007 | Van Luchene |
| 2007/0265091 | A1 | 11/2007 | Aguilar, Jr. et al. |
| 2008/0004093 | A1 | 1/2008 | Van Luchene et al. |
| 2008/0004094 | A1 | 1/2008 | Mueller et al. |
| 2008/0004116 | A1 | 1/2008 | Van Luchene et al. |
| 2008/0004119 | A1 | 1/2008 | Van Luchene et al. |
| 2008/0070697 | A1 | 3/2008 | Robinson et al. |
| 2008/0086534 | A1 | 4/2008 | Bardak et al. |
| 2008/0153595 | A1 | 6/2008 | Chickering et al. |
| 2008/0189189 | A1 | 8/2008 | Morgenstern |
| 2008/0207327 | A1 | 8/2008 | Van Luchene et al. |
| 2008/0220876 | A1 | 9/2008 | Mehta et al. |
| 2008/0303811 | A1 | 12/2008 | Van Luchene |
| 2008/0313011 | A1 | 12/2008 | Rose et al. |
| 2008/0313105 | A1 | 12/2008 | Mattern |
| 2009/0011822 | A1 | 1/2009 | Englman et al. |
| 2009/0061999 | A1 | 3/2009 | Popovich et al. |
| 2009/0109229 | A1* | 4/2009 | Hamilton, II ........... A63F 13/12 345/474 |
| 2009/0119188 | A1 | 5/2009 | Pagan |
| 2009/0197681 | A1 | 8/2009 | Krishnamoorthy et al. |
| 2009/0204908 | A1 | 8/2009 | Ganz et al. |
| 2009/0210324 | A1 | 8/2009 | Bhogal et al. |
| 2009/0247282 | A1 | 10/2009 | Cheng |
| 2009/0253494 | A1* | 10/2009 | Fitch ...................... A63F 13/12 463/25 |
| 2010/0004055 | A1 | 1/2010 | Gormley et al. |
| 2010/0121729 | A1 | 5/2010 | Betzler et al. |
| 2010/0125490 | A1 | 5/2010 | Kiciman et al. |
| 2010/0160038 | A1 | 6/2010 | Youm et al. |
| 2010/0191770 | A1 | 7/2010 | Cho et al. |
| 2010/0210364 | A1 | 8/2010 | York et al. |
| 2010/0222124 | A1 | 9/2010 | Goshen |
| 2010/0227669 | A1 | 9/2010 | Van Luchene |
| 2010/0227675 | A1 | 9/2010 | Luxton et al. |
| 2010/0317419 | A1 | 12/2010 | Osborne |
| 2010/0331084 | A1* | 12/2010 | Fuzell-Casey .......... A63F 13/69 463/31 |
| 2011/0081967 | A1 | 4/2011 | Butcher et al. |
| 2011/0212762 | A1* | 9/2011 | Ocko ..................... G06Q 10/10 463/25 |
| 2011/0225069 | A1 | 9/2011 | Cramer et al. |
| 2011/0231781 | A1 | 9/2011 | Betzler et al. |
| 2011/0264489 | A1 | 10/2011 | Ganetakos et al. |
| 2011/0264563 | A1 | 10/2011 | Lundberg et al. |
| 2011/0300923 | A1 | 12/2011 | Van Luchene |
| 2012/0015722 | A1 | 1/2012 | Mooney et al. |
| 2012/0015740 | A1 | 1/2012 | Vanbragt et al. |
| 2012/0094766 | A1 | 4/2012 | Reynolds et al. |
| 2012/0109830 | A1 | 5/2012 | Vogel |
| 2012/0122587 | A1 | 5/2012 | Kelly et al. |
| 2012/0172132 | A1 | 7/2012 | Molyneaux et al. |
| 2012/0329560 | A1 | 12/2012 | Kelly et al. |
| 2013/0036064 | A1 | 2/2013 | Osvald et al. |
| 2013/0296050 | A1 | 11/2013 | Kelly et al. |
| 2014/0243101 | A1 | 8/2014 | Kelly et al. |
| 2014/0256434 | A1 | 9/2014 | Bronstein Bendayan |
| 2016/0256781 | A1 | 9/2016 | Bronstein Bendayan |

OTHER PUBLICATIONS

U.S. Appl. No. 12/947,356 U.S. Pat. No. 8,272,956, filed Nov. 16, 2010, Social Supply Harvest Mechanic for Interactive Social Games.

U.S. Appl. No. 13/244,895 U.S. Pat. No. 8,133,116, filed Sep. 26, 2011, Social Supply Harvest Mechanic for Interactive Social Games.

U.S. Appl. No. 13/244,896 U.S. Pat. No. 8,137,193, filed Sep. 26, 2011, Supply Delivery for Interactive Social Games.

U.S. Appl. No. 13/244,910 U.S. Pat. No. 8,137,194, filed Sep. 26, 2011, Supply Delivery for Interactive Social Games.

U.S. Appl. No. 13/602,464 U.S. Pat. No. 8,491,396, filed Sep. 4, 2012, Game Supply Delivery Systems and Methods.

U.S. Appl. No. 13/933,315, filed Jul. 2, 2013, Game Supply Delivery Systems and Methods.

U.S. Appl. No. 14/269,561, filed May 5, 2014, Game Supply Delivery Systems and Methods.

U.S. Appl. No. 14/282,423 U.S. Pat. No. 9,387,403, filed May 20, 2014, Asset Transfers Between Interactive Social Games.

U.S. Appl. No. 15/158,369, filed May 18, 2016, Asset Transfers Between Interactive Social Games.

U.S. Appl. No. 13/277,864 U.S. Pat. No. 8,758,119, filed Oct. 20, 2011, Asset Transfers Between Interactive Social Games.

"U.S. Appl. No. 13/947,356, Notice of Allowance dated Jul. 18, 2012", 16 pgs.

"U.S. Appl. No. 13/244,895, Notice of Allowance dated Jan. 27, 2012", 15 pgs.

"U.S. Appl. No. 13/244,896, Notice of Allowance dated Feb. 2, 2012", 15 pgs.

"U.S. Appl. No. 13/244,910, Notice of Allowance dated Feb. 2, 2012", 15 pgs.

"U.S. Appl. No. 13/277,864 , Response filed Aug. 19, 2013 to Non Final Office Action dated Mar. 19, 2012", 9 pgs.

"U.S. Appl. No. 13/277,864, Final Office Action dated Oct. 18, 2013", 12 pgs.

"U.S. Appl. No. 13/277,864, Non Final Office Action dated Mar. 19, 2013", 18 pgs.

(56) References Cited

OTHER PUBLICATIONS

"U.S. Appl. No. 13/277,864, Notice of Allowance dated Apr. 9, 2014", 11 pgs.
"U.S. Appl. No. 13/277,864, Response filed Feb. 19, 2013 to Restriction Requirement dated Jan. 16, 2013", 8 pgs.
"U.S. Appl. No. 13/277,864, Response filed Mar. 12, 2014 to Final Office Action dated Oct. 18, 2013", 9 pgs.
"U.S. Appl. No. 13/277,864, Restriction Requirement dated Jan. 16, 2013", 7 pgs.
"U.S. Appl. No. 13/602,464, Notice of Allowance dated Mar. 27, 2013", 13 pgs.
"U.S. Appl. No. 13/933,315, Examiner Interview Summary dated Dec. 1, 2014", 3 pgs.
"U.S. Appl. No. 13/933,315, Final Office Action dated Mar. 5, 2015", 10 pgs.
"U.S. Appl. No. 13/933,315, Non Final Office Action dated Oct. 2, 2014", 8 pgs.
"U.S. Appl. No. 13/933,315, Notice of Allowance dated Feb. 19, 2014", 11 pgs.
"U.S. Appl. No. 13/933,315, Preliminary Amendment filed Nov. 25, 2013", 6 pgs.
"U.S. Appl. No. 13/933,315, Response filed Dec. 9, 2014 to Non Final Office Action dated Oct. 2, 2014", 15 pgs.
"U.S. Appl. No. 14/269,561, First Action Interview—Pre-Interview Communication dated Jun. 14, 2016", 4 pgs.
"U.S. Appl. No. 14/269,561, First Action Interview—Office Action Summary dated Aug. 19, 2016", 3 pgs.
"U.S. Appl. No. 14/282,423, Corrected Notice of Allowance dated Apr. 14, 2016", 11 pgs.
"U.S. Appl. No. 14/282,423, Examiner Interview Summary dated Jan. 25, 2016", 3 pgs.
"U.S. Appl. No. 14/282,423, Final Office Action dated Mar. 26, 2015", 16 pgs.
"U.S. Appl. No. 14/282,423, Non Final Office Action dated Oct. 1, 2015", 10 pgs.
"U.S. Appl. No. 14/282,423, Non Final Office Action dated Nov. 3, 2014", 13 pgs.
"U.S. Appl. No. 14/282,423, Notice of Allowance dated Mar. 18, 2016", 15 pgs.
"U.S. Appl. No. 14/282,423, Preliminary Amendment filed May 21, 2014", 7 pgs.
"U.S. Appl. No. 14/282,423, Response filed Jan. 20, 2016 to Non-Final Office Action dated Oct. 1, 2015", 13 pgs.
"U.S. Appl. No. 14/282,423, Response filed Feb. 3, 2015 to Non Final Office Action dated Nov. 3, 2014", 10 pgs.
"U.S. Appl. No. 14/282,423, Response filed Jul. 27, 2015 to Final Office Action dated Mar. 26, 2015", 11 pgs.
"U.S. Appl. No. 14/282,423, Response filed Oct. 17, 2014 to Restriction Requirement dated Sep. 15, 2014", 8 pgs.
"U.S. Appl. No. 14/282,423, Restriction Requirement dated Sep. 15, 2014", 6 pgs.
"U.S. Appl. No. 15/150,369, Response filled Jun. 6, 2017 to Final Office Action dated Apr. 20, 2017", 8 pgs.
"U.S. Appl. No. 15/158,369, Final Office Action dated Apr. 20, 2017", 6 pgs.
"U.S. Appl. No. 15/158,369, Non Final Office Action dated Oct. 27, 2016", 7 pgs.
"U.S. Appl. No. 15/158,369, Notice of Allowance dated Jun. 20, 2017", 10 pgs.
"U.S. Appl. No. 15/158,369, Preliminary Amendment filed May 19, 2016", 8 pgs.
"U.S. Appl. No. 15/158,369, Response filed Mar. 22, 2017 to Non Final Office Action dated Oct. 27, 2016", 8 pgs.
"CityVille Updated Train System: Everything You Need to Know", [Online]. Retrieved from the Internet:<http://blog.games/com/2011/03/19/cityville-updated-train-system-everything-you-need-to-know/>, (Accessed Jan. 11, 2012), 4 pgs.
"Guide for Using the CityVille Train Station", [Online]. Retrieved from the Internet: <http://wwwcityvilleinfo.com/guide-for-using-the-cityville-train-station>, (Accessed Jan. 11, 2012), 3 pgs.
"International Application Serial No. PCT/US2011/045786, International Preliminary Report on Patentability dated May 30, 2013", 8 pgs.
"International Application Serial No. PCT/US2011/045786, Search Report dated Jan. 3, 2012", 2 pgs.
"International Application Serial No. PCT/US2011/045786, Written Opinion dated Jan. 3, 2012", 6 pgs.
"Selling in the Marketplace", [Online]. Retrieved from the Internet: <http://community.secondlife.com/t5/tkb/articleprintpage/tkb-id/English_KB%40tkb/article-id/91>, (Accessed Jan. 11, 2012), 4 pgs.
"Shopping in the Marketplace", [Online]. Retrieved from the Internet: <http://community.secondlife.com/t5/tkb/articleprintpage/tkb-id/English_KB%40tkb/article-id/91>, (Accessed Jan. 11, 2012), 5 pgs.
"Social Games: A White Paper by VerticPortals", [Online]. Retrieved from the Internet: <http://www.verticportals.com/socialgaming/>, (Accessed on Jan. 11, 2012), 16 pgs.
"Social Network Game", [Online]. Retrieved from the Internet: <http://en.wikipedia.org/wiki/Social_network_game>, (Accessed Jan. 11, 2012), 5 pgs.
"The Sims Social", [Online] Retrieved from the Internet: <http://en.wikipedia.org/wiki/The_Sims_Social>, (Accessed Jan. 11, 2012), 9 pgs.
"Virtual Economy", [Online]. Retrieved from the Internet: <http://en.wikipedia.org/wiki/Virtual_economy>, (Accessed Jan. 11, 2012), 12 pgs.
Cardwell-Winters, Kellie, "CityVille Walkthrough", [Online]. Retrieved from the Internet: <http://www.gamezebo.com/games/cityville/walkthrough>, (Dec. 4, 2010), 23 pgs.
Christopher, Mack, "Happy Elements Takes to Bartending with Lounge Bar on Facebook", [Online]. Retrieved from Internet: <http://www.insidesocialgames.com/2010/08/16/happy-elements-lounge-bar-facebook-china/>, (Aug. 16, 2010).
Guo, Yue, et al., "Why Do People Buy Virtual Items in Virtual Worlds? An Empirical Test of a Conceptual Model", 17th European Conference on Information Systems, (2009), 14 pgs.
Kwong, Justin A, "Getting the Goods on Virtual Items: A Fresh Look at Transaction in Multi-User Online Environments", William Mitchell Law Review, 37(4), (2011), 34 pgs.
Passman, Michael H, "Transaction of Virtual Items in Virtual Worlds", Albany Law Journal of Science and Technology, 18(1), (2008), 259-292.
Wikja, "Restaurant City Friends", [Online]. Retrieved from Internet: <http://restaurantcity.wikia.com/wiki/Friends>, (Feb. 13, 2010).

\* cited by examiner

ASSET TRANSFERS BETWEEN INTERACTIVE SOCIAL GAMES

RELATED APPLICATIONS

This application is a continuation of U.S. patent application Ser. No. 15/158,369, filed on May 18, 2016, which is a continuation of U.S. patent application Ser. No. 14/282,423, filed on May 20, 2014, which is a continuation of U.S. patent application Ser. No. 13/277,864, filed on Oct. 20, 2011, the benefit of priority of each of which is claimed hereby, and each of which is incorporated by reference herein in its entirety.

TECHNICAL FIELD

The present disclosure generally relates to games and applications in general and, in particular embodiments, to computer-implemented, online social games.

BACKGROUND

Many games include various types of in-game assets that a player can obtain for use within the game. For example, a player may acquire game points, gold coins, experience points, character levels, character attributes, virtual cash, game keys, tools, energy or other in-game items of value. In many games, there are also various types of in-game obstacles that a player needs to overcome to advance within the game. In-game obstacles can include tasks, puzzles, opponents, levels, gates, actions, and so forth. In some games, a goal of the game includes acquiring certain in-game assets, which are then used to complete in-game tasks or to overcome certain in-game obstacles.

An electronic social networking system typically operates with one or more social networking servers providing interaction between users such that a particular user can specify other users of the social networking system as "friends." A collection of users and the "friend" connections between users can form a social graph that can be traversed to find additional connections between users, much like a graph of nodes connected by edges can be traversed.

BRIEF DESCRIPTION OF THE DRAWINGS

Some embodiments are illustrated by way of example and not limitation in the figures of the accompanying drawings.

DETAILED DESCRIPTION

Example systems and methods to transfer assets between interactive social games are described. In the following description, for purposes of explanation, numerous specific details are set forth in order to provide a thorough understanding of example embodiments. It will be evident, however, to one skilled in the art that the described systems and methods may be practiced without these specific details.

The systems and methods described herein allow players to transfer in-game assets to other players playing different games. An in-game asset refers to any in-game item, skill, capability or other game-related element that has value in at least one game. Further, an in-game asset may include an in-game item, skill, capability or other game-related element that is useful or has utility in at least one game. Example in-game assets include game points, gold coins, experience points, character levels, character attributes, virtual cash, game keys, tools, vehicles, structures, energy, fuel, food or other in-game items of value, usefulness or utility. A particular in-game asset may have value in any number of different games, although the value may vary from one game to another. For example, a particular farming tool may have greater value in a farming game than in a building development game.

Figure 1:
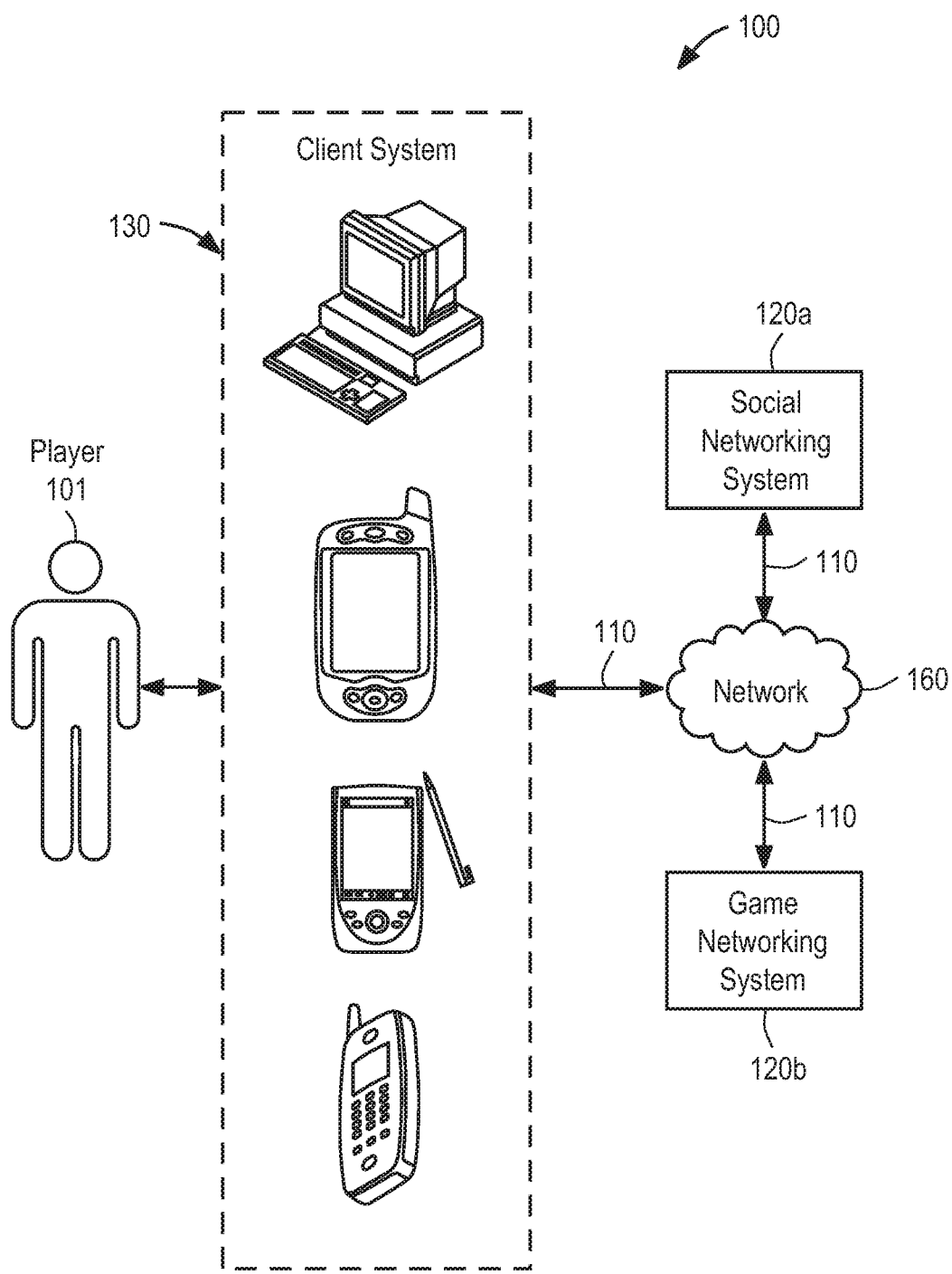
FIG. 1 illustrates an example of a system for implementing particular disclosed embodiments.

FIG. 1 illustrates an example of a system for implementing various disclosed embodiments. In particular embodiments, system 100 comprises player 101, social networking system 120a, game networking system 120b, client system 130, and network 160. The components of system 100 can be connected to each other in any suitable configuration, using any suitable type of connection. The components may be connected directly or over a network 160, which may be any suitable network. For example, one or more portions of network 160 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, another type of network, or a combination of two or more such networks.

Social networking system 120a is a network-addressable computing system that can host one or more social graphs. Social networking system 120a can generate, store, receive, and transmit social networking data. Social networking system 120a can be accessed by the other components of system 100 either directly or via network 160. Game networking system 120b is a network-addressable computing system that can host one or more online games. Game networking system 120b can generate, store, receive, and transmit game-related data, such as, for example, game account data, game input, game state data, and game displays. Game networking system 120b can be accessed by the other components of system 100 either directly or via network 160. Player 101 may use client system 130 to access, send data to, and receive data from social networking system 120a and game networking system 120b. Client system 130 can access social networking system 120a or game networking system 120b directly, via network 160, or via a third-party system. As an example and not by way of limitation, client system 130 may access game networking system 120b via social networking system 120a. Client system 130 can be any suitable computing device, such as a personal computer, laptop, cellular phone, smart phone, computing tablet, and the like.

Although FIG. 1 illustrates a particular number of players 101, social networking systems 120a, game networking systems 120b, client systems 130, and networks 160, this disclosure contemplates any suitable number of players 101, social networking systems 120a, game networking systems 120b, client systems 130, and networks 160. As an example and not by way of limitation, system 100 may include one or more game networking systems 120b and no social networking systems 120a. As another example and not by way of limitation, system 100 may include a system that comprises both social networking system 120a and game networking system 120b. Moreover, although FIG. 1 illustrates a particular arrangement of player 101, social networking system 120a, game networking system 120b, client system 130, and network 160, this disclosure contemplates any suitable arrangement of player 101, social networking system 120a, game networking system 120b, client system 130, and network 160.

The components of system 100 may be connected to each other using any suitable connections 110. For example, suitable connections 110 include wireline (such as, for example, Digital Subscriber Line (DSL) or Data Over Cable Service Interface Specification (DOCSIS)), wireless (such as, for example, Wireless Fidelity (Wi-Fi) or Worldwide Interoperability for Microwave Access (WiMAX)), or optical (such as, for example, Synchronous Optical Network (SONET) or Synchronous Digital Hierarchy (SDH)) connections. In particular embodiments, one or more connections 110 each include an ad hoc network, an intranet, an extranet, a VPN, a LAN, a WLAN, a WAN, a WWAN, a MAN, a portion of the Internet, a portion of the PSTN, a cellular telephone network, or another type of connection, or a combination of two or more such connections. Connections 110 need not necessarily be the same throughout system 100. One or more first connections 110 may differ in one or more respects from one or more second connections 110. Although FIG. 1 illustrates particular connections between player 101, social networking system 120a, game networking system 120b, client system 130, and network 160, this disclosure contemplates any suitable connections between player 101, social networking system 120a, game networking system 120b, client system 130, and network 160. As an example and not by way of limitation, in particular embodiments, client system 130 may have a direct connection to social networking system 120a or game networking system 120b, bypassing network 160.

Online Games and Game Systems

In an online computer game, a game engine manages the game state of the game. Game state comprises all game play parameters, including player character state, non-player character (NPC) state, in-game object state, game world state (e.g., internal game clocks, game environment), and other game play parameters. Each player 101 controls one or more player characters (PCs). The game engine controls all other aspects of the game, including non-player characters (NPCs), and in-game objects. The game engine also manages game state, including player character state for currently active (online) and inactive (offline) players.

An online game can be hosted by game networking system 120b, which can be accessed using any suitable connection with a suitable client system 130. A player may have a game account on game networking system 120b, wherein the game account can contain a variety of information associated with the player (e.g., the player's personal information, financial information, purchase history, player character state, game state). In some embodiments, a player may play multiple games on game networking system 120b, which may maintain a single game account for the player with respect to all the games, or multiple individual game accounts for each game with respect to the player. In some embodiments, game networking system 120b can assign a unique identifier to each player 101 of an online game hosted on game networking system 120b. Game networking system 120b can determine that a player 101 is accessing the online game by reading the user's cookies, which may be appended to HyperText Transfer Protocol (HTTP) requests transmitted by client system 130, and/or by the player 101 logging onto the online game.

In particular embodiments, player 101 may access an online game and control the game's progress via client system 130 (e.g., by inputting commands to the game at the client device). Client system 130 can display the game interface, receive inputs from player 101, transmit user inputs or other events to the game engine, and receive instructions from the game engine. The game engine can be executed on any suitable system (such as, for example, client system 130, social networking system 120a, or game networking system 120b). As an example and not by way of limitation, client system 130 can download client components of an online game, which are executed locally, while a remote game server, such as game networking system 120b, provides backend support for the client components and may be responsible for maintaining application data of the game, processing the inputs from the player, updating and/or synchronizing the game state based on the game logic and each input from the player, and transmitting instructions to client system 130. As another example and not by way of limitation, each time player 101 provides an input to the game through the client system 130 (such as, for example, by typing on the keyboard or clicking the mouse of client system 130), the client components of the game may transmit the player's input to game networking system 120b.

In an online multiplayer game, players may control player characters (PCs), while a game engine controls non-player characters (NPCs) and game features. The game engine also manages player character state and game state and tracks the state for currently active (i.e., online) players and currently inactive (i.e., offline) players. A player character can have a set of attributes and a set of friends associated with the player character. As used herein, the term "player character state" can refer to any in-game characteristic of a player character, such as location, assets, levels, condition, health, status, inventory, skill set, name, orientation, affiliation, specialty, and so on. Player characters may be displayed as graphical avatars within a user interface of the game. In other implementations, no avatar or other graphical representation of the player character is displayed. Game state encompasses the notion of player character state and refers to any parameter value that characterizes the state of an in-game element, such as a non-player character, a virtual object (such as a wall or castle), and so forth. The game engine may use player character state to determine the outcome of game events, while sometimes also considering set or random variables. Generally, a player character's probability of having a more favorable outcome is greater when the player character has a better state. For example, a healthier player character is less likely to die in a particular encounter relative to a weaker player character or non-player character. In some embodiments, the game engine can assign a unique client identifier to each player.

In particular embodiments, player 101 may access particular game instances of an online game. A game instance is a copy of a specific game play area that is created during runtime. In particular embodiments, a game instance is a discrete game play area where one or more players 101 can interact in synchronous or asynchronous play. A game instance may be, for example, a level, zone, area, region, location, virtual space, or other suitable play area. A game instance may be populated by one or more in-game objects. Each object may be defined within the game instance by one or more variables, such as, for example, position, height, width, depth, direction, time, duration, speed, color, and other suitable variables. A game instance may be exclusive (i.e., accessible by specific players) or non-exclusive (i.e., accessible by any player). In particular embodiments, a game instance is populated by one or more player characters controlled by one or more players 101 and one or more in-game objects controlled by the game engine. When accessing an online game, the game engine may allow player 101 to select a particular game instance to play from a plurality of game instances. Alternatively, the game engine may automatically select the game instance that player 101 will access. In particular embodiments, an online game comprises only one game instance that all players 101 of the online game can access.

In particular embodiments, a specific game instance may be associated with one or more specific players. A game instance is associated with a specific player when one or more game parameters of the game instance are associated with the specific player. As an example and not by way of limitation, a game instance associated with a first player may be named "First Player's Play Area." This game instance may be populated with the first player's PC and one or more in-game objects associated with the first player. In particular embodiments, a game instance associated with a specific player may only be accessible by that specific player. As an example and not by way of limitation, a first player may access a first game instance when playing an online game, and this first game instance may be inaccessible to all other players. In other embodiments, a game instance associated with a specific player may be accessible by one or more other players, either synchronously or asynchronously with the specific player's game play. As an example and not by way of limitation, a first player may be associated with a first game instance, but the first game instance may be accessed by all first-degree friends in the first player's social network. In particular embodiments, the game engine may create a specific game instance for a specific player when that player accesses the game. As an example and not by way of limitation, the game engine may create a first game instance when a first player initially accesses an online game, and that same game instance may be loaded each time the first player accesses the game. As another example and not by way of limitation, the game engine may create a new game instance each time a first player accesses an online game, wherein each game instance may be created randomly or selected from a set of predetermined game instances.

In particular embodiments, the set of in-game actions available to a specific player may be different in a game instance that is associated with that player compared to a game instance that is not associated with that player. The set of in-game actions available to a specific player in a game instance associated with that player may be a subset, superset, or independent of the set of in-game actions available to that player in a game instance that is not associated with him. As an example and not by way of limitation, a first player may be associated with Blackacre Farm in an online farming game. The first player may be able to plant crops on Blackacre Farm. If the first player accesses a game instance associated with another player, such as Whiteacre Farm, the game engine may not allow the first player to plant crops in that game instance. However, other in-game actions may be available to the first player, such as watering or fertilizing crops on Whiteacre Farm.

In particular embodiments, a game engine can interface with a social graph. Social graphs are models of connections between entities (e.g., individuals, users, contacts, friends, players, player characters, non-player characters, businesses, groups, associations, concepts, etc.). These entities are considered "users" of the social graph; as such, the terms "entity" and "user" may be used interchangeably when referring to social graphs herein. A social graph can have a node for each entity and edges to represent relationships between entities. A node in a social graph can represent any entity. In particular embodiments, a unique client identifier can be assigned to each user in the social graph. This disclosure assumes that at least one entity of a social graph is a player or player character in an online multiplayer game, though this disclosure includes any suitable social graph users.

The minimum number of edges needed to connect a player (or player character) to another user is considered the degree of separation between them. For example, where the player and the user are directly connected (one edge), they are deemed to be separated by one degree of separation. The user would be a so-called "first-degree friend" of the player. Where the player and the user are connected through one other user (two edges), they are deemed to be separated by two degrees of separation. This user would be a so-called "second-degree friend" of the player. Where the player and the user are connected through N edges (or N−1 other users), they are deemed to be separated by N degrees of separation. This user would be a so-called "Nth-degree friend." As used herein, the term "friend" means only first-degree friends, unless context suggests otherwise.

Within the social graph, each player (or player character) has a social network. A player's social network includes all users in the social graph within $N_{max}$ degrees of the player, where $N_{max}$ is the maximum degree of separation allowed by the system managing the social graph (such as, for example, social networking system 120a or game networking system 120b). In one embodiment, $N_{max}$ equals 1, such that the player's social network includes only first-degree friends. In another embodiment, $N_{max}$ is unlimited and the player's social network is coextensive with the social graph.

In particular embodiments, the social graph is managed by game networking system 120b, which is managed by the game operator. In other embodiments, the social graph is part of a social networking system 120a managed by a third-party (e.g., Facebook, Friendster, Myspace). In yet other embodiments, player 101 has a social network on both game networking system 120b and social networking system 120a, wherein player 101 can have a social network on the game networking system 120b that is a subset, superset, or independent of the player's social network on social networking system 120a. In such combined systems, game network system 120b can maintain social graph information with edge type attributes that indicate whether a given friend is an "in-game friend," an "out-of-game friend," or both. The various embodiments disclosed herein are operable when the social graph is managed by social networking system 120a, game networking system 120b, or both.

Figure 2:
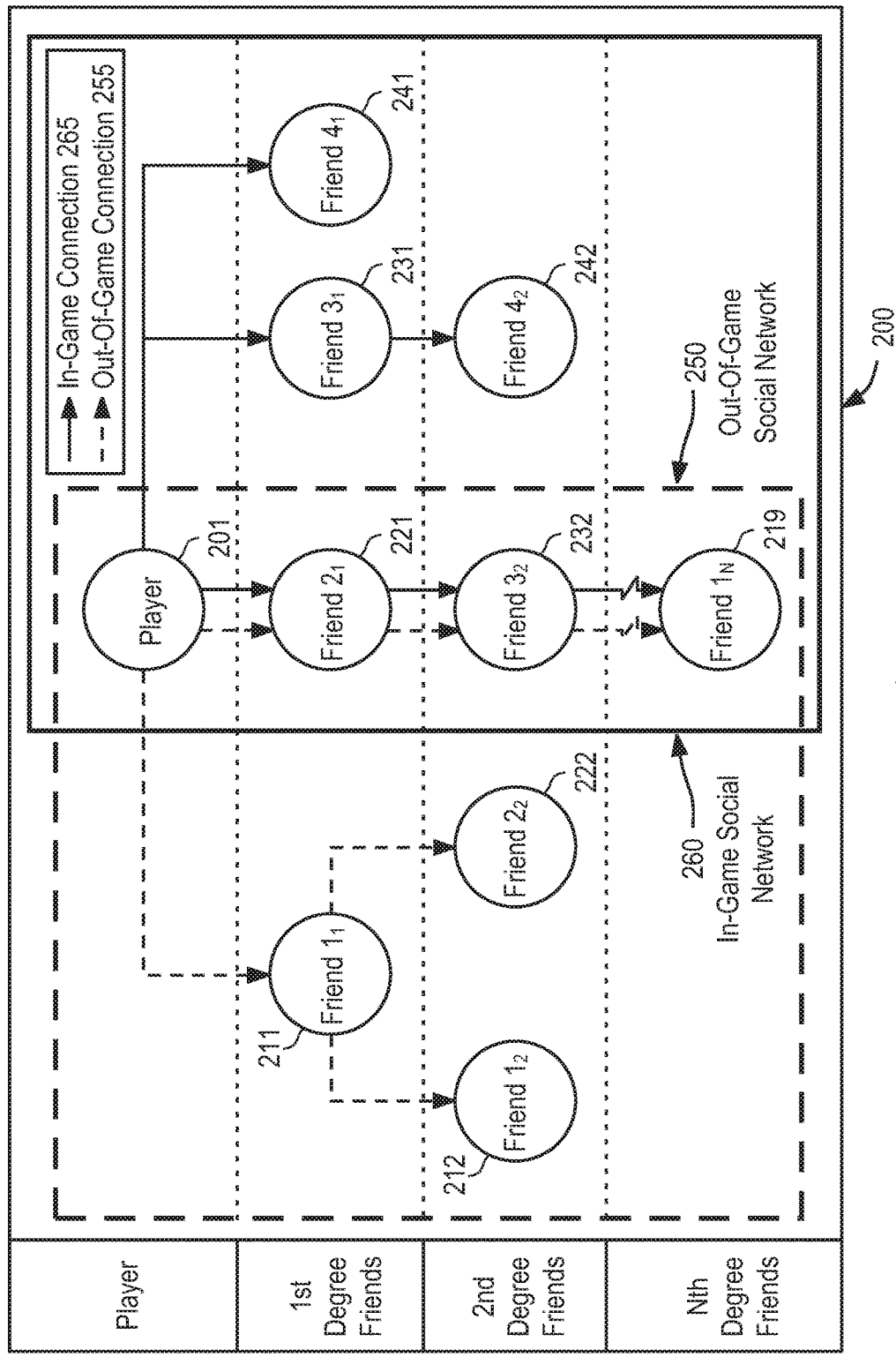
FIG. 2 illustrates an example social network.

FIG. 2 shows an example of a social network within a social graph. As shown, Player 201 can be associated, connected or linked to various other users, or "friends," within the social network 200. These associations, connections or links can track relationships between users within the social network 200 and are commonly referred to as online "friends" or "friendships" between users. Each friend or friendship in a particular user's social network within a social graph is commonly referred to as a "node." For purposes of illustration and not by way of limitation, the details of social network 200 will be described in relation to Player 201. As used herein, the terms "player" and "user" can be used interchangeably and can refer to any user or character in an online multiuser game system or social networking system. As used herein, the term "friend" can mean any node within a player's social network.

As shown in FIG. 2, Player 201 has direct connections with several friends. When Player 201 has a direct connection with another individual, that connection is referred to as a first-degree friend. In social network 200, Player 201 has two first-degree friends. That is, Player 201 is directly connected to Friend $1_1$ 211 and Friend $2_1$ 221. In a social graph, it is possible for individuals to be connected to other individuals through their first-degree friends (i.e., friends of friends). As described above, each edge necessary to connect a player to another user is considered the degree of separation. For example, FIG. 2 shows that Player 201 has three second-degree friends to which he is connected via his connection to his first-degree friends. Second-degree Friend $1_2$ 212 and Friend $2_2$ 222 are connected to Player 201 via his first-degree Friend $1_1$ 211. Second-degree Friend $3_2$ 232 is connected to Player 201 via his first-degree Friend $2_1$ 221. The limit on the depth of friend connections, or the number of degrees of separation for associations, that Player 201 is allowed is typically dictated by the restrictions and policies implemented by social networking system 120a.

In various embodiments, Player 201 can have Nth-degree friends connected to him through a chain of intermediary degree friends as indicated in FIG. 2. For example, Nth-degree Friend $1_N$ 219 is connected to Player 201 via second-degree Friend $3_2$ 232 and one or more other higher-degree friends. Various embodiments may utilize the distinction between the various degrees of friendship relative to Player 201.

In particular embodiments, a player (or player character) can have a social graph within an online multiplayer game that is maintained by the game engine and another social graph maintained by a separate social networking system. FIG. 2 depicts an example of in-game social network 260 and out-of-game social network 250. In this example, Player 201 has out-of-game connections 255 to a plurality of friends, forming out-of-game social network 250. Here, Friend $1_1$ 211 and Friend $2_1$ 221 are first-degree friends with Player 201 in his out-of-game social network 250. Player 201 also has in-game connections 265 to a plurality of players, forming in-game social network 260. Here, Friend $2_1$ 221, Friend $3_1$ 231, and Friend $4_1$ 241 are first-degree friends with Player 201 in his in-game social network 260. Additionally, Friend $4_2$ 242 is a second-degree friend with Player 201 in the in-game social network 260. In some embodiments, it is possible for a friend to be in both the out-of-game social network 250 and the in-game social network 260. Here, Friend $2_1$ 221 has both an out-of-game connection 255 and an in-game connection 265 with Player 201, such that Friend $2_1$ 221 is in both Player 201's in-game social network 260 and Player 201's out-of-game social network 250.

As with other social networks, Player 201 can have second-degree and higher-degree friends in both his in-game and out of game social networks. In some embodiments, it is possible for Player 201 to have a friend connected to him both in his in-game and out-of-game social networks, wherein the friend is at different degrees of separation in each network. For example, if Friend $2_2$ 222 had a direct in-game connection with Player 201, Friend $2_2$ 222 would be a second-degree friend in Player 201's out-of-game social network, but a first-degree friend in Player 201's in-game social network. In particular embodiments, a game engine can access in-game social network 260, out-of-game social network 250, or both.

In particular embodiments, the connections in a player's in-game social network can be formed both explicitly e.g., users "friend" each other) and implicitly (e.g., the system observes user behaviors and "friends" users to each other). Unless otherwise indicated, reference to a friend connection between two or more players can be interpreted to cover both explicit and implicit connections, using one or more social graphs and other factors to infer friend connections. The friend connections can be unidirectional or bidirectional. It is also not a limitation of this description that two players who are deemed "friends" for the purposes of this disclosure are not friends in real life (i.e., in disintermediated interactions or the like), but that could be the case.

Figure 3:
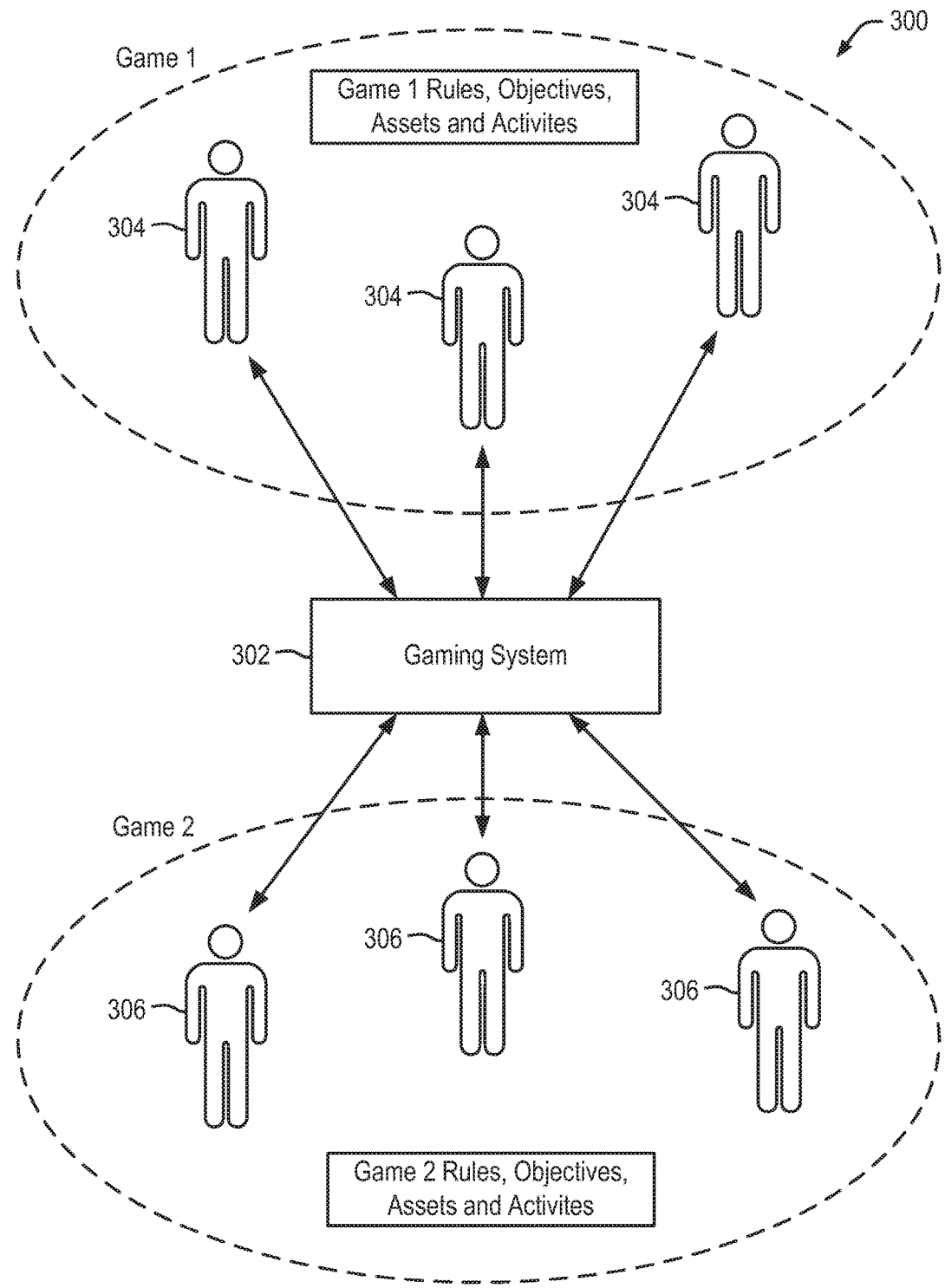
FIG. 3 illustrates an example environment in which multiple players participate in different games supported by a gaming system.

FIG. 3 illustrates an example environment 300 in which multiple players (also referred to as "users") participate in different games supported by a gaming system. In the example of FIG. 3, a gaming system 302 supports two games (labeled "Game 1" and "Game 2"). Each game has its own rules, objectives, assets and activities that govern the manner in which the game is played. For example, Game 1 may be associated with developing a city or community while Game 2 is associated with building a military organization to fight virtual enemies. The different games may be developed by the same entity or developed by different entities. Further, the different games may be facilitated (or implemented) by a common entity or by different entities.

As shown in FIG. 3, multiple players 304 are playing Game 1 and multiple players 306 are playing Game 2. In particular embodiments, any number of players can play a specific game. Further, players may actively play more than one game. For example, one or more players 304 playing Game 1 may also be playing Game 2 as well as any number of other games (not shown).

Players 304 and 306 may interact with gaming system 302 using any device and any communication mechanism supported by gaming system 302. In particular embodiments, players 304 and 306 interact with gaming system 302 using a computing device, such as a personal computer, laptop, cellular phone, smart phone, computing tablet, game console, set top box, portable entertainment device, and the like. Players 304 and 306 may communicate with gaming system 302 through, for example, a wired or wireless communication link using any communication protocol (or multiple communication protocols). In particular embodiments, players 304 and 306 communicate with gaming system 302 through one or more data communication networks, such as the Internet.

As discussed herein, the example environment shown in FIG. 3 allows players to transfer in-game assets to other players playing different games. For example, a particular player 304 playing Game 1 may transfer an in-game asset from Game 1 to a particular player 306 playing Game 2. This in-game asset transfer is facilitated by gaming system 302. In another example, a particular player 304 playing Game 1 may transfer a specific in-game asset to multiple players 306 playing Game 2. Additional details regarding the transfer of in-game assets between players of different games are discussed herein.

Although two games are shown in FIG. 3, in other embodiments gaming system 302 may support any number of different games and facilitate the transfer of in-game assets between the different games. Further, alternate embodiments may include multiple gaming systems to support multiple different games. In these embodiments, the multiple gaming systems communicate with one another, as needed, to facilitate inter-game asset transfer.

Figure 4:
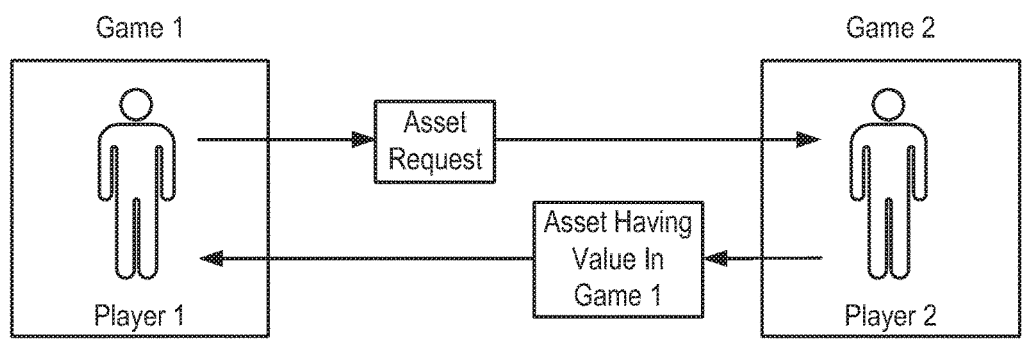
FIG. 4 illustrates an example in-game asset transfer between players of two different games.

FIG. 4 illustrates an example in-game asset transfer between players of two different games. In the example of FIG. 4, Player 1 is playing Game 1 and Player 2 is playing Game 2. Player 1 requests an in-game asset by sending an asset request to Player 2. In this example, the requested in-game asset is something of value in Game 1 and useful to Player 1. The requested in-game asset may also have value in Game 2. For example, if the requested in-game asset is a gold coin, that in-game asset may have value in a variety of different games. In other situations, the requested in-game asset has value in Game 1, but does not have value in Game 2. For example, a tool used in a farming game does not have value in a poker game. In another situation, the requested in-game asset has more value in Game 1 than it does in Game 2. For example, if the requested in-game asset is fuel, that in-game asset typically has more value in a vehicle-based game (in which the vehicles use the fuel) than in a city development game where vehicles are a less important part of the game. The relevant games may be designed to promote inter-game player cooperation through inter-game asset transfer. Two or more games may, for example, be configured such that objects having particular value or utility in one game are initially found exclusively (or most commonly) in another game.

Player 2 receives the asset request from Player 1. In response to the asset request, Player 2 may choose to provide the requested in-game asset to Player 1. As mentioned above, the requested in-game asset has value in Game 1. In particular embodiments, Player 2 already has at least one of the requested in-game assets as a result of playing Game 2. In this situation, Player 2 can provide one of their accumulated in-game assets to Player 1, which removes the in-game asset from Player 2's inventory. In some implementations, a player may be limited to providing or requesting a predetermined number of in-game assets during a particular time period.

In other embodiments, Player 2 does not have the requested in-game asset (e.g., the asset is not used in Game 2 or Player 2 has not yet acquired the in-game asset as a result of playing Game 2). In this situation, the game may allow Player 2 to provide the requested in-game asset to Player 1 even though Player 2 does not have the requested in-game asset.

In a particular embodiment, Player 1 and Player 2 are friends with different gaming interests. Although they both like to play games, they prefer different types of games. The systems and methods described herein allow Player 1 and Player 2 to interact with each other while playing games, without requiring them to play the same game. Thus, the two players can exchange assets to support one another in their respective games, while each continues to play the game they prefer.

The example of FIG. 4 represents an example in-game asset transfer between players of two different games. In alternate embodiments, similar procedures are used to by a single player to transfer assets between two games played by that single player. For example, a player may transfer virtual currency, goods, or energy from a first game played by the player to a second game played by the same player. Additionally, the player may transfer assets between different versions of the same game (e.g., between a first generation of a particular game and a second generation of the same game).

Figure 5:
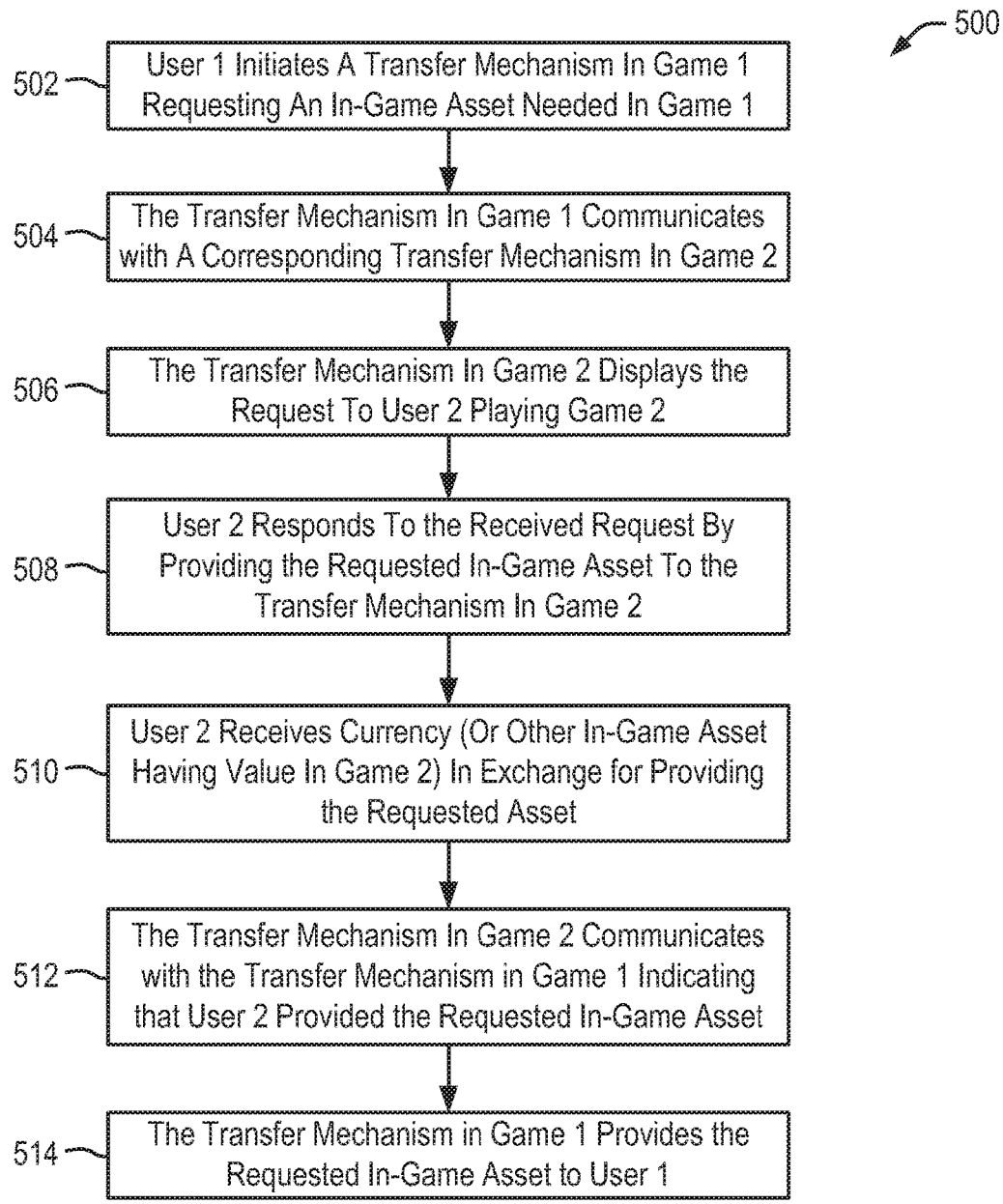
FIG. 5 is a flow diagram of a method, in accordance with an embodiment, of transferring an in-game asset between two different games.

FIG. 5 is a flow diagram of a method 500, in accordance with an embodiment, of transferring an in-game asset between two different games. Different games may have distinct rules and distinct game play activities. Additionally, different games may include in-game environments that are thematically different. In particular embodiments, different games are administered by distinct game engines or gaining systems. In other embodiments, the same gaming system may implement multiple different games. Different games may further include different versions of a game (e.g., version 1 of a game having specific rules and game play activities, and version 2 of the game having different rules and/or game play activities).

A first user (User 1) initiates a transfer mechanism in a first game (Game 1) to request an in-game asset needed in Game 1 at 502. In various embodiments, the transfer mechanism may be implemented as a vehicle (e.g., a train, truck, boat, airplane or space ship), a delivery container (e.g., a shipping box or envelope), a building or structure (e.g., a delivery office or a post office), a portal (e.g., a door or gate), or other object associated with the transfer of an in-game asset. In a particular example, User 1 initiates a transfer mechanism by providing an in-game asset request to the transfer mechanism.

Method 500 continues as the transfer mechanism in Game 1 communicates with a corresponding transfer mechanism in Game 2 at 504. In particular embodiments, the transfer mechanisms in Game 1 and Game 2 are implemented in the same manner (e.g., both transfer mechanisms are shipping boxes). In other embodiments, the transfer mechanism is implemented differently in each game (e.g., the Game 1 transfer mechanism is a boat and the Game 2 transfer mechanism is a post office). The communication between the transfer mechanisms includes, for example, identification of the request, the player requesting the asset, and the asset associated with the request.

As a result of the communication at 504, the transfer mechanism in Game 2 displays the request to a second user (User 2) playing Game 2 at 506. In particular embodiments, the request is displayed graphically in the transfer mechanism. For example, if the transfer mechanism is a vehicle, the request may be delivered by a vehicle. Alternatively, the transfer mechanism may provide a separate visual indicator representing the received request (e.g., flashing lights on a vehicle or a "message" indicator at a delivery office). In other embodiments, indication of the request is provided by audible sound or other indicator instead of (or in addition to) the visual indicator.

User 2 responds to the received request by providing the requested in-game asset to the transfer mechanism in Game 2 at 508. In particular embodiments, User 2 deposits a graphical representation of the in-game asset (such as a coin or tool icon) into the transfer mechanism or a receptacle associated with the transfer mechanism. For example, User 2 may drag and drop an in-game asset onto a train or into an envelope to facilitate a transfer of the in-game asset to the requesting user (User 1). In other embodiments, User 2 responds to the received request by activating a button, icon or other visual indicator that acknowledges User 2's desire to transfer the in-game asset to User 1. In particular embodiments, User 2 receives in-game currency (or other in-game asset having value in Game 2) in exchange for providing the requested asset at 510. User 2 may receive a predetermined in-game asset or may have the option to select among multiple in-game assets. The in-game asset provided to User 2 has value in Game 2, but does not necessarily have value in Game 1. In alternate embodiments, User 2 does not receive any in-game currency or other in-game asset in exchange for providing the requested asset to User 1. In these alternate embodiments, User 2 is providing the requested in-game asset to User 1 as a gift.

Method 500 continues as the transfer mechanism in Game 2 communicates with the corresponding transfer mechanism in Game 1 by indicating that User 2 provided the requested in-game asset at 512. In response to this communication, the transfer mechanism in Game 1 provides the requested in-game asset to User 1 at 514. In particular embodiments the requested in-game asset is provided to User 1 by presenting a visual indicator through, for example, the transfer mechanism. For example, if the transfer mechanism is a boat, the visual indicator may include a boat arriving at a port or dock containing the requested in-game asset. Alternatively, the transfer mechanism may provide a visual indicator (e.g., a flashing light or notification message) identifying receipt of the requested in-game asset.

Figure 6:
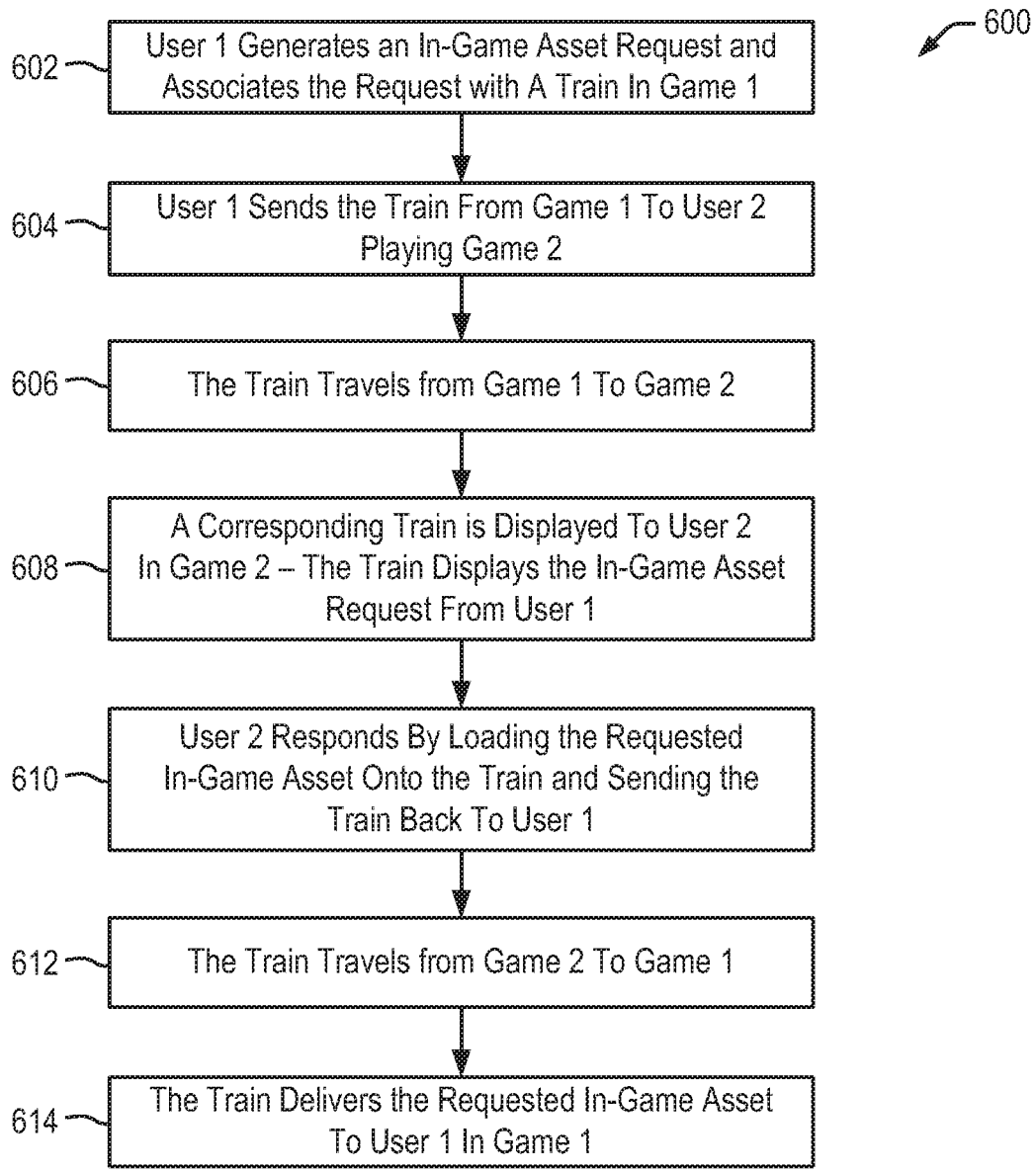
FIG. 6 is a flow diagram of a method, in accordance with an embodiment, of using an in-game virtual train to transfer in-game assets between two different games.

FIG. 6 is a flow diagram of a method 600, in accordance with an embodiment, of using an in-game virtual train to transfer in-game assets between two different games. In particular embodiments, the train represents the transfer mechanism discussed above with respect to FIG. 5. Initially, User 1 generates an in-game asset request and associates the request with a train in Game 1 at 602. For example, the user may place a visual indicator of a request in the train or otherwise initiate a request for an in-game asset with the train. After associating the in-game asset request with the train, User 1 sends the train from Game 1 to User 2 playing Game 2 at 604. This sending of the train by User 1 is also referred to as "dispatching" the train. The train travels from Game 1 to Game 2 at 606, thereby transporting (or communicating) the in-game asset request from User 1 to Game 2. In particular embodiments, the movement of the train from Game 1 to Game 2 is represented graphically to User 1 as a train leaving a train station in Game 1, and represented graphically to User 2 as a train arriving at a train station in Game 2.

After the train travels from Game 1 to Game 2, a corresponding train is displayed to User 2 in Game 2 at 608. This corresponding train displays the in-game asset request from User 1 that was generated in Game 1. The in-game asset request may appear, for example, as an item carried by the train or as another indicator that identifies the existence of the request associated with the train to User 2. Method 600 continues as User 2 responds to the displayed train by loading the requested in-game asset onto the train and sending the train back to User 1 at 610. For example, User 2 may load the requested in-game asset onto the train by dragging and dropping the requested in-game asset from an inventory (or other asset store) and activating a visual indicator to send the train to User 1 in Game 1. Alternatively, User 2 may select a visual indicator or perform another activity that loads the requested in-game asset onto the train and sends the train to User 1 in Game 1.

After User 2 has loaded the requested in-game asset onto the train, the train travels from Game 2 to Game 1 at 612. The train delivers the requested in-game asset to User 1 in Game 1 at 614. In particular embodiments, the requested in-game asset appears as an item carried by the train. In other embodiments, the train includes another indicator that identifies the existence of the in-game asset on the train. User 1 can unload (or otherwise retrieve) the in-game asset from the train, for example, by clicking on the train or performing another activity that makes the in-game asset available for use by User 1. In alternate embodiments, the in-game asset is automatically unloaded from the train and provided to User 1 (e.g., placed in User 1's inventory) when the train arrives in Game 1.

Figure 7:
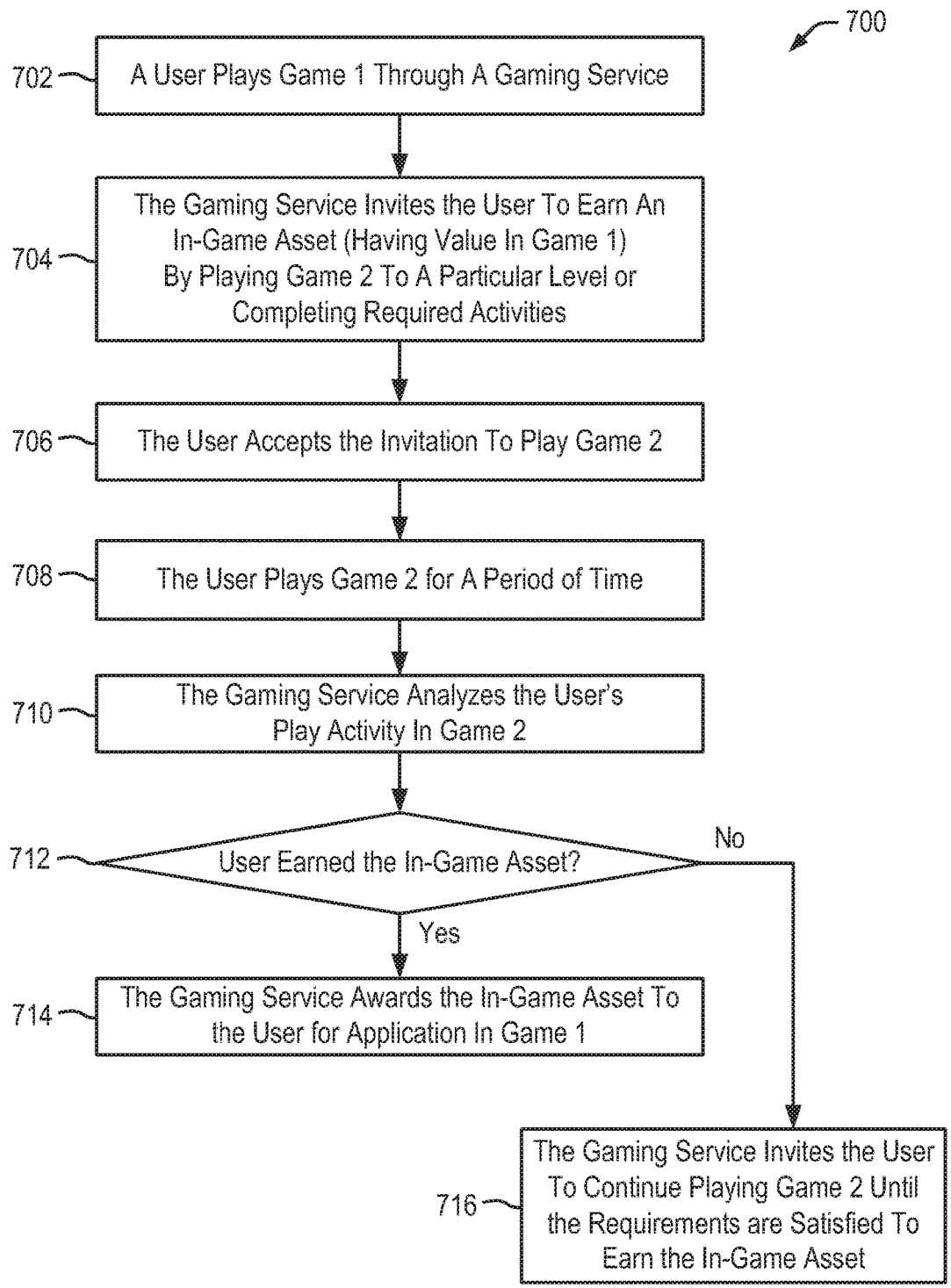
FIG. 7 is a flow diagram of a method, in accordance with an embodiment, of providing an in-game asset to a user based on game play activity.

FIG. 7 is a flow diagram of a method 700, in accordance with an embodiment, of providing an in-game asset to a user based on game play activity. Initially, a user plays a first game (Game 1) through a gaming service at 702. The gaming service invites the user to earn an in-game asset having value in Game 1 by playing Game 2 at 704. To earn the in-game asset, the user needs to play Game 2 to a particular level or complete one or more specified activities. For example, the user may need to advance to a tenth level in Game 2 to earn fuel (the in-game asset) for use in Game 1. Alternatively, the user may need to build three buildings and grow five plots of crops in Game 2 to earn seven gold coins (the in-game asset) for use in Game 1.

Method 700 continues as the user accepts the invitation to play Game 2 at 706. The user plays Game 2 for a period of time at 708. The user may play Game 2 immediately after receiving the invitation from the gaming service or at a future time. The user may play Game 2 for a single session or play Game 2 repeatedly during multiple sessions. After the user has played Game 2 during one or more sessions, the gaming service analyzes the user's play activity in Game 2 at 710. For example, the gaming service determines whether the user's play activity in Game 2 satisfies one or more requirements associated with earning the in-game asset. If the user has earned the in-game asset at 712, the gaming service awards the in-game asset to the user at 714 for application in Game 1, For example, if the user earns seven gold coins based on their game play in Game 2, those gold coins are added to the user's inventory (or other asset store) in Game 1. In particular embodiments, the in-game asset is provided to the user through a visual expression of a transfer mechanism of the type discussed herein. If the user has not yet earned the in-game asset at 712, the gaming service invites the user at 716 to continue playing Game 2 until the requirements are satisfied to earn the in-game asset. For example, the gaming service may send the user an email message, text message, in-game message, or other communication reminding the user to continue playing Game 2 to earn the in-game asset.

Figure 8:
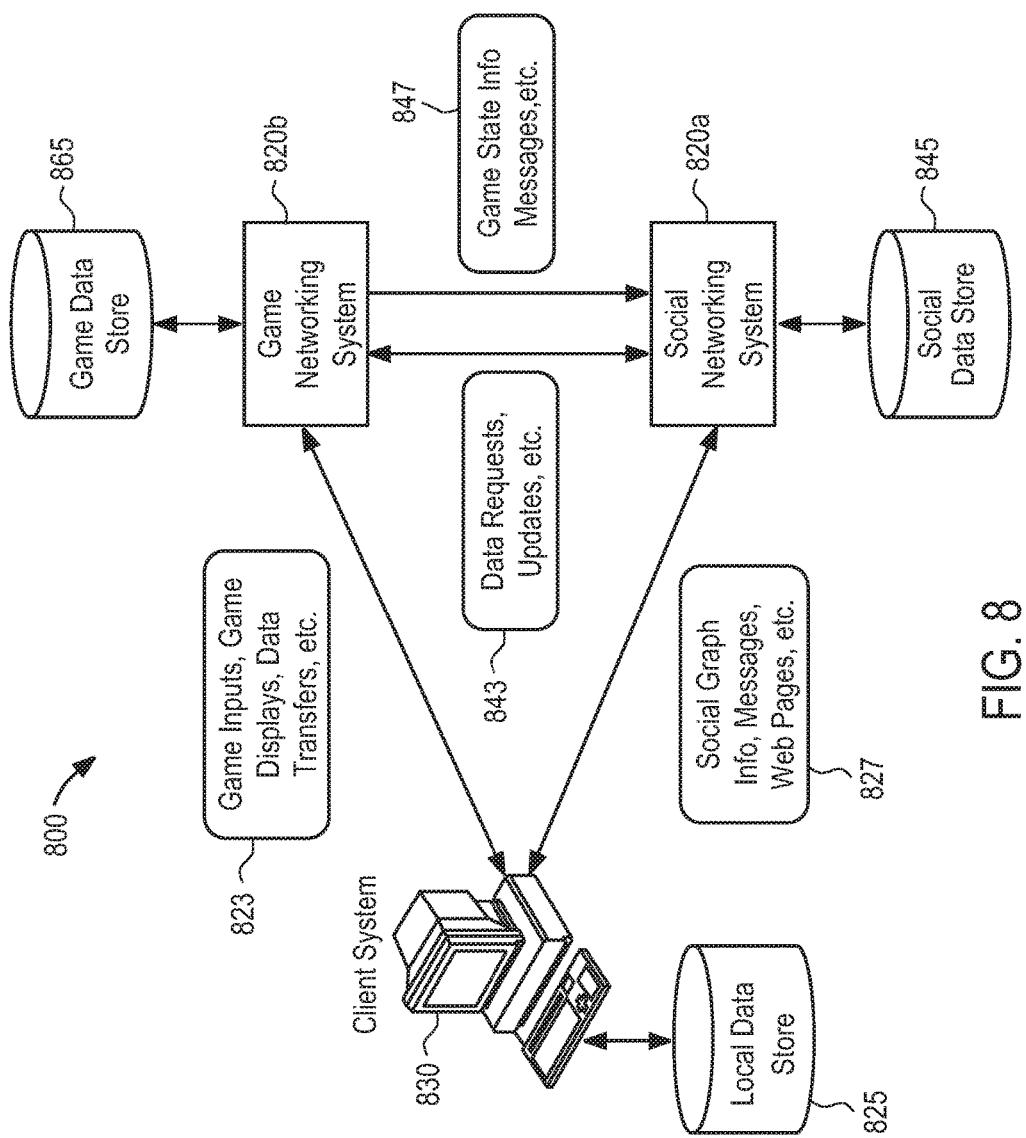
FIG. 8 illustrates an example data flow in a system.

FIG. 8 illustrates an example data flow between the components of system 800. In particular embodiments, system 800 can include client system 830, social networking system 820*a*, and game networking system 820*b*. The components of system 800 can be connected to each other in any suitable configuration, using any suitable type of connection. The components may be connected directly or over any suitable network. Client system 830, social networking system 820*a*, and game networking system 820*b* can each have one or more corresponding data stores such as local data store 825, social data store 845, and game data store 865, respectively. Social networking system 820*a* and game networking system 820*b* can also have one or more servers that can communicate with client system 830 over an appropriate network. Social networking system 820*a* and game networking system 820*b* can have, for example, one or more internet servers for communicating with client system 830 via the Internet. Similarly, social networking system 820*a* and game networking system 820*b* can have one or more mobile servers for communicating with client system 830 via a mobile network (e.g., GSM (Global System for Mobile Communications), PCS (Personal Communication Services), Wi-Fi, WPAN, etc.). In some embodiments, one server may be able to communicate with client system 830 over both the Internet and a mobile network. In other embodiments, separate servers can be used.

Client system 830 can receive and transmit data 823 to and from game networking system 820b. This data can include, for example, webpages, messages, game inputs, game displays, HTTP packets, data requests, transaction information, updates, and other suitable data. At some other time, or at the same time, game networking system 820b can communicate data 843, 847 (e.g., game state information, game system account information, page info, messages, data requests, updates, etc.) with other networking systems, such as social networking system 820a (e.g., Facebook, Myspace, etc.). Client system 830 can also receive and transmit data 827 to and from social networking system 820a. This data can include, for example, webpages, messages, social graph information, social network displays, HTTP packets, data requests, transaction information, updates, and other suitable data.

Communication between client system 830, social networking system 820a, and game networking system 820b can occur over any appropriate electronic communication medium or network using any suitable communications protocols. For example, client system 830, as well as various servers of the systems described herein, may include Transport Control Protocol/Internet Protocol (TCP/IP) networking stacks to provide for datagram and transport functions. Of course, any other suitable network and transport layer protocols can be utilized.

In addition, hosts or end-systems described herein may use a variety of higher layer communications protocols, including client-server (or request-response) protocols (such as HTTP) and other communications protocols (such as HTTP-S, FTP (File Transfer Protocol), SNMP (Simple Network Management Protocol), TELNET, and a number of other protocols), may be used. In addition, a server in one interaction context may be a client in another interaction context. In particular embodiments, the information transmitted between hosts may be formatted as HyperText Markup Language (HTML) documents. Other structured document languages or formats can be used, such as XML (Extensible Markup Language), and the like. Executable code objects, such as JavaScript and ActionScript, can also be embedded in the structured documents.

In some client-server protocols, such as the use of HTML over HTTP, a server generally transmits a response to a request from a client. The response may comprise one or more data objects. For example, the response may comprise a first data object, followed by subsequently transmitted data objects. In particular embodiments, a client request may cause a server to respond with a first data object, such as an HTML page, which itself refers to other data objects. A client application, such as a browser, will request these additional data objects as it parses or otherwise processes the first data object.

In particular embodiments, an instance of an online game can be stored as a set of game state parameters that characterize the state of various in-game objects, such as, for example, player character state parameters, non-player character parameters, and virtual item parameters. In particular embodiments, game state is maintained in a database as a serialized, unstructured string of text data as a so-called Binary Large Object (BLOB). When a player accesses an online game on game networking system 820b, the BLOB containing the game state for the instance corresponding to the player can be transmitted to client system 830 for use by a client-side executed object to process. In particular embodiments, the client-side executable may be a FLASH-based game, which can de-serialize the game state data in the BLOB. As a player plays the game, the game logic implemented at client system 830 maintains and modifies the various game state parameters locally. The client-side game logic may also batch game events, such as mouse clicks, and transmit these events to game networking system 820b. Game networking system 820b may itself operate by retrieving a copy of the BLOB from a database or an intermediate memory cache (memcache) layer. Game networking system 820b can also de-serialize the BLOB to resolve the game state parameters and execute its own game logic based on the events in the batch file of events transmitted by the client to synchronize the game state on the server side. Game networking system 820b may then re-serialize the game state, now modified, into a BLOB and pass this to a memory cache layer for lazy updates to a persistent database.

With a client-server environment in which the online games may run, one server system, such as game networking system 820b, may support multiple client systems 830. At any given time, there may be multiple players at multiple client systems 830 all playing the same online game. In practice, the number of players playing the same game at the same time may be very large. As the game progresses with each player, multiple players may provide different inputs to the online game at their respective client systems 830, and multiple client systems 830 may transmit multiple player inputs and/or game events to game networking system 820b for further processing. In addition, multiple client systems 830 may transmit other types of application data to game networking system 820b.

In particular embodiments, a computer-implemented game may be a text-based or turn-based game implemented as a series of web pages that are generated after a player selects one or more actions to perform. The web pages may be displayed in a browser client executed on client system 830. As an example and not by way of limitation, a client application downloaded to client system 830 may operate to serve a set of webpages to a player. As another example and not by way of limitation, a computer-implemented game may be an animated or rendered game executable as a stand-alone application or within the context of a webpage or other structured document. In particular embodiments, the computer-implemented game may be implemented using Adobe Flash-based technologies. As an example and not by way of limitation, a game may be fully or partially implemented as a SWF object that is embedded in a web page and executable by a Flash media player plug-in. In particular embodiments, one or more described webpages may be associated with or accessed by social networking system 820a. This disclosure contemplates using any suitable application for the retrieval and rendering of structured documents hosted by any suitable network-addressable resource or website.

Application event data of a game is any data relevant to the game (e.g., player inputs). In particular embodiments, each application datum may have a name and a value, and the value of the application datum may change (i.e., be updated) at any time. When an update to an application datum occurs at client system 830, either caused by an action of a game player or by the game logic itself, client system 830 may need to inform game networking system 820b of the update. For example, if the game is a farming game with a harvest mechanic (such as Zynga FarmVille), an event can correspond to a player clicking on a parcel of land to harvest a crop. In such an instance, the application event data may identify an event or action (e.g., harvest) and an object in the game to which the event or action applies. For illustration purposes and not by way of limitation, system 800 is discussed in reference to updating a multi-player online game hosted on a network-addressable system (such as, for example, social networking system 820*a* or game networking system 820*b*), where an instance of the online game is executed remotely on a client system 830, which then transmits application event data to the hosting system such that the remote game server synchronizes game state associated with the instance executed by the client system 830.

In particular embodiments, one or more objects of a game may be represented as an Adobe Flash object. Flash may manipulate vector and raster graphics, and supports bidirectional streaming of audio and video. "Flash" may mean the authoring environment, the player, or the application files. In particular embodiments, client system 830 may include a Flash client. The Flash client may be configured to receive and run Flash application or game object code from any suitable networking system (such as, for example, social networking system 820*a* or game networking system 820*b*). In particular embodiments, the Flash client may be run in a browser client executed on client system 830. A player can interact with Flash objects using client system 830 and the Flash client. The Flash objects can represent a variety of in-game objects. Thus, the player may perform various in-game actions on various in-game objects by making various changes and updates to the associated Flash objects. In particular embodiments, in-game actions can be initiated by clicking or similarly interacting with a Flash object that represents a particular in-game object. For example, a player can interact with a Flash object to use, move, rotate, delete, attack, shoot, or harvest an in-game object. This disclosure contemplates performing any suitable in-game action by interacting with any suitable Flash object. In particular embodiments, when the player makes a change to a Flash object representing an in-game object, the client-executed game logic may update one or more game state parameters associated with the in-game object. To ensure synchronization between the Flash object shown to the player at client system 830, the Flash client may send the events that caused the game state changes to the in-game object to game networking system 820*b*. However, to expedite the processing and hence the speed of the overall gaming experience, the Flash client may collect a batch of some number of events or updates into a batch file. The number of events or updates may be determined by the Flash client dynamically or determined by game networking system 820*b* based on server loads or other factors. For example, client system 830 may send a batch file to game networking system 820*b* whenever 50 updates have been collected or after a threshold period of time, such as every minute.

As used herein, the term "application event data" may refer to any data relevant to a computer-implemented game application that may affect one or more game state parameters, including, for example and without limitation, changes to player data or metadata, changes to player social connections or contacts, player inputs to the game, and events generated by the game logic. In particular embodiments, each application datum may have a name and a value. The value of an application datum may change at any time in response to the game play of a player or in response to the game engine (e.g., based on the game logic). In particular embodiments, an application data update occurs when the value of a specific application datum is changed. In particular embodiments, each application event datum may include an action or event name and a value (such as an object identifier). Thus, each application datum may be represented as a name-value pair in the batch file. The batch file may include a collection of name-value pairs representing the application data that have been updated at client system 830. In particular embodiments, the batch file may be a text file and the name-value pairs may be in string format.

In particular embodiments, when a player plays an online game on client system 830, game networking system 820*b* may serialize all the game-related data, including, for example and without limitation, game states, game events, and user inputs, for this particular user and this particular game into a BLOB and store the BLOB in a database. The BLOB may be associated with an identifier that indicates that the BLOB contains the serialized game-related data for a particular player and a particular online game. In particular embodiments, while a player is not playing the online game, the corresponding BLOB may be stored in the database. This enables a player to stop playing the game at any time without losing the current state of the game the player is in. When a player resumes playing the game next time, game networking system 820*b* may retrieve the corresponding BLOB from the database to determine the most-recent values of the game-related data. In particular embodiments, while a player is playing the online game, game networking system 820*b* may also load the corresponding BLOB into a memory cache so that the game system may have faster access to the BLOB and the game-related data contained therein.

Systems and Methods

In particular embodiments, one or more described webpages may be associated with a networking system or networking service. However, alternate embodiments may have application to the retrieval and rendering of structured documents hosted by any type of network addressable resource or web site. Additionally, as used herein, a user may be an individual, a group, or an entity (such as a business or third party application).

Figure 9:
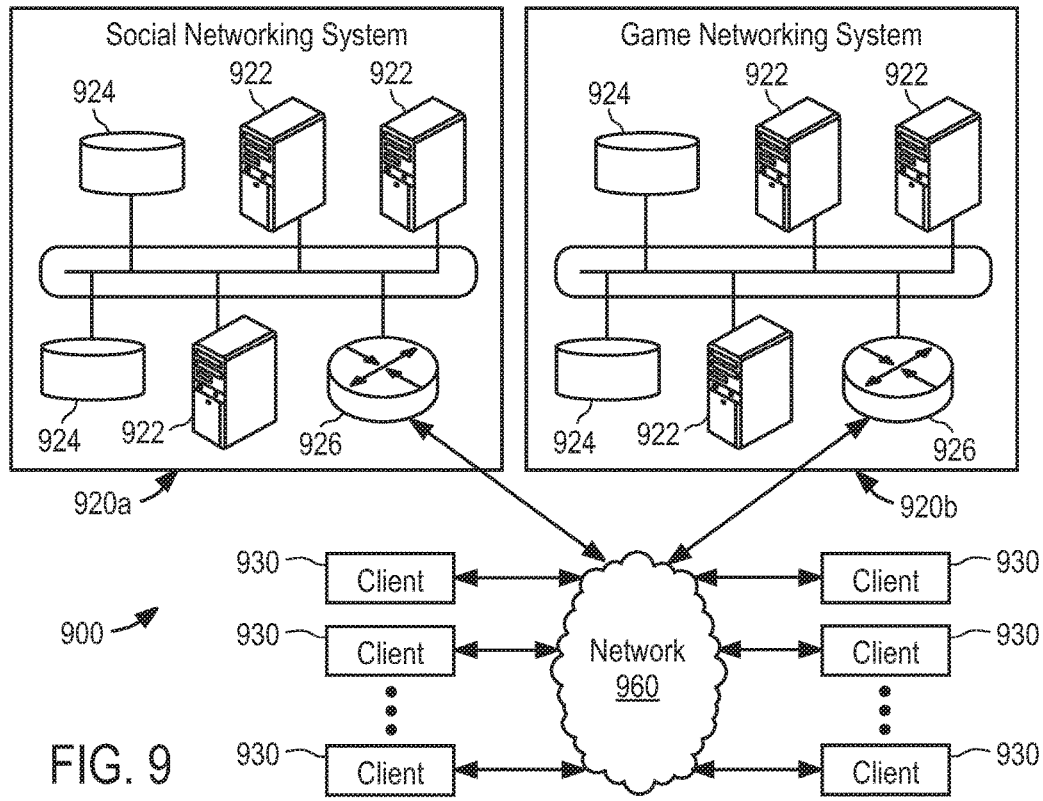
FIG. 9 illustrates an example network environment.

Particular embodiments may operate in a WAN environment, such as the Internet, including multiple network addressable systems. FIG. 9 illustrates an example network environment 900, in which various example embodiments may operate. Network cloud 960 generally represents one or more interconnected networks, over which the systems and hosts described herein can communicate. Network cloud 960 may include packet-based WANs (such as the Internet), private networks, wireless networks, satellite networks, cellular networks, paging networks, and the like. As FIG. 9 illustrates, particular embodiments may operate in a network environment comprising one or more networking systems, such as social networking system 920*a*, game networking system 920*b*, and one or more client systems 930. The components of social networking system 920*a* and game networking system 920*b* operate analogously; as such, hereinafter they may be referred to simply at networking system 920. Client systems 930 are operably connected to the network environment via a network service provider, a wireless carrier, or any other suitable means.

Networking system 920 is a network addressable system that, in various example embodiments, comprises one or more physical servers 922 and data stores 924. The one or more physical servers 922 are operably connected to network cloud 960 via, by way of example, a set of routers and/or networking switches 926. In an example embodiment, the functionality hosted by the one or more physical servers 922 may include web or HTTP servers, FTP servers, as well as, without limitation, webpages and applications implemented using Common Gateway Interface (CGI) script, PHP Hyper-text Preprocessor (PHP), Active Server Pages (ASP), HTML, XML, Java, JavaScript, Asynchronous JavaScript and XML (AJAX), Flash, ActionScript, and the like.

Physical servers 922 may host functionality directed to the operations of networking system 920. Hereinafter servers 922 may be referred to as server 922, although server 922 may include numerous servers hosting, for example, networking system 920, as well as other content distribution servers, data stores, and databases. Data store 924 may store content and data relating to, and enabling, operation of networking system 920 as digital data objects. A data object, in particular embodiments, is an item of digital information typically stored or embodied in a data file, database, or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, and the like. Logically, data store 924 corresponds to one or more of a variety of separate and integrated databases, such as relational databases and object-oriented databases, that maintain information as an integrated collection of logically related records or files stored on one or more physical systems. Structurally, data store 924 may generally include one or more of a large class of data storage and management systems. In particular embodiments, data store 924 may be implemented by any suitable physical system(s) including components, such as one or more database servers, mass storage media, media library systems, storage area networks, data storage clouds, and the like. In one example embodiment, data store 924 includes one or more servers, databases (e.g., MySQL), and/or data warehouses. Data store 924 may include data associated with different networking system 920 users and/or client systems 930.

Client system 930 is generally a computer or computing device including functionality for communicating (e.g., remotely) over a computer network. Client system 930 may be a desktop computer, laptop computer, personal digital assistant (RDA), in- or out-of-car navigation system, smart phone or other cellular or mobile phone, or mobile gaming device, among other suitable computing devices. Client system 930 may execute one or more client applications, such as a web browser (e.g., Microsoft Internet Explorer, Mozilla Firefox, Apple Safari, Google Chrome, and Opera), to access and view content over a computer network. In particular embodiments, the client applications allow a user of client system 930 to enter addresses of specific network resources to be retrieved, such as resources hosted by networking system 920. These addresses can be Uniform Resource Locators (URLs) and the like. In addition, once a page or other resource has been retrieved, the client applications may provide access to other pages or records when the user "clicks" on hyperlinks to other resources. By way of example, such hyperlinks may be located within the webpages and provide an automated way for the user to enter the URL of another page and to retrieve that page.

A webpage or resource embedded within a webpage, which may itself include multiple embedded resources, may include data records, such as plain textual information, or more complex digitally encoded multimedia content, such as software programs or other code objects, graphics, images, audio signals, videos, and so forth. One prevalent markup language for creating webpages is HTML. Other common web browser-supported languages and technologies include XML, the Extensible Hypertext Markup Language (XHTML), JavaScript, Flash, ActionScript, Cascading Style Sheet (CSS), and, frequently, Java. By way of example, HTML enables a page developer to create a structured document by denoting structural semantics for text and links, as well as images, web applications, and other objects that can be embedded within the page. Generally, a webpage may be delivered to a client as a static document; however, through the use of web elements embedded in the page, an interactive experience may be achieved with the page or a sequence of pages. During a user session at the client, the web browser interprets and displays the pages and associated resources received or retrieved from the website hosting the page, as well as, potentially, resources from other websites.

When a user at a client system 930 desires to view a particular webpage (hereinafter also referred to as target structured document) hosted by networking system 920, the user's web browser, or other document rendering engine or suitable client application, formulates and transmits a request to networking system 920. The request generally includes a URL or other document identifier as well as metadata or other information. By way of example, the request may include information identifying the user, such as a user identification, as well as information identifying or characterizing the web browser or operating system running on the user's client computing device 930. The request may also include location information identifying a geographic location of the user's client system or a logical network location of the user's client system. The request may also include a timestamp identifying when the request was transmitted.

Although the example network environment described above and illustrated in FIG. 9 is described with respect to social networking system 920*a* and game networking system 920*b*, this disclosure encompasses any suitable network environment using any suitable systems. As an example and not by way of limitation, the network environment may include online media systems, online reviewing systems, online search engines, online advertising systems, or any combination of two or more such systems.

Figure 10:
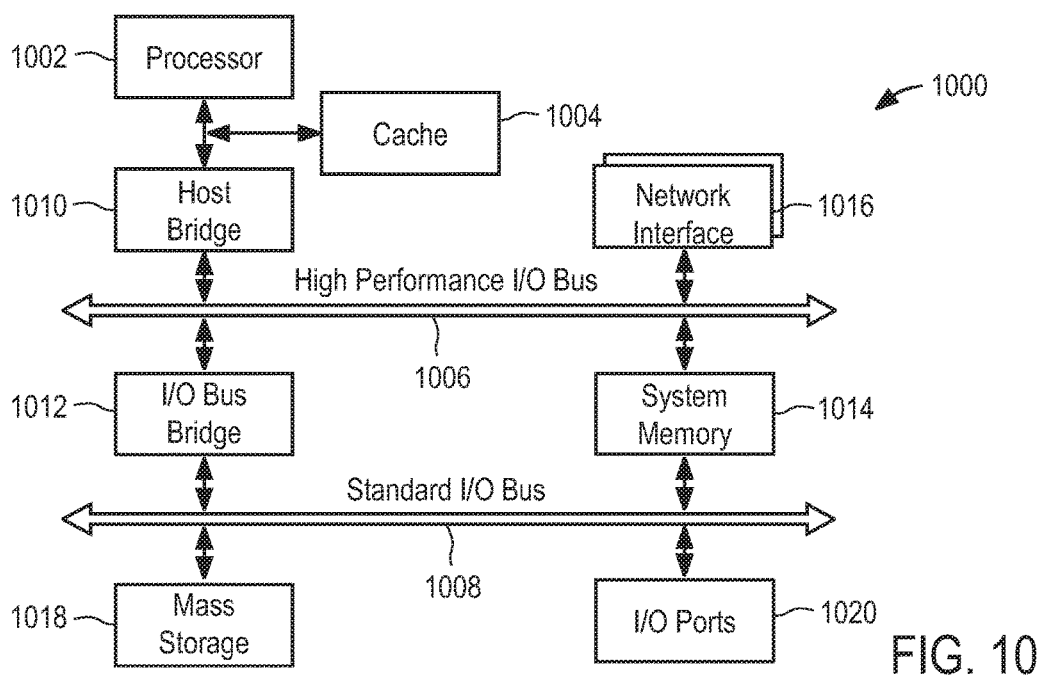
FIG. 10 illustrates an example computing system architecture.

FIG. 10 illustrates an example computing system architecture, which may be used to implement a server 922 or a client system 930. In one embodiment, a hardware system 1000 comprises a processor 1002, a cache memory 1004, and one or more executable modules and drivers, stored on a tangible computer readable medium, directed to the functions described herein. Additionally, hardware system 1000 may include a high performance input/output (I/O) bus 1006 and a standard I/O bus 1008. A host bridge 1010 may couple processor 1002 to high performance I/O bus 1006, whereas I/O bus bridge 1012 couples the two buses 1006 and 1008 to each other. A system memory 1014 and one or more network/communication interfaces 1016 may couple to bus 1006. Hardware system 1000 may further include video memory (not shown) and a display device coupled to the video memory. Mass storage 1018 and I/O ports 1020 may couple to bus 1008. Hardware system 1000 may optionally include a keyboard, a pointing device, and a display device (not shown) coupled to bus 1008. Collectively, these elements are intended to represent a broad category of computer hardware systems, including, but not limited to, general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 1000 are described in greater detail below. In particular, network interface 1016 provides communication between hardware system 1000 and any of a wide range of networks, such as an Ethernet (e.g., IEEE 802.3) network, a backplane, and the like. Mass storage 1018 provides permanent storage for the data and programming instructions to perform the above-described functions implemented in servers 922, whereas system memory 1014 (e.g., DRAM (Dynamic Random Access Memory)) provides temporary storage for the data and programming instructions when executed by processor 1002. I/O ports 1020 are one or more serial and/or parallel communication ports that provide communication between additional peripheral devices, which may be coupled to hardware system 1000.

Hardware system 1000 may include a variety of system architectures, and various components of hardware system 1000 may be rearranged. For example, cache 1004 may be on-chip with processor 1002. Alternatively, cache 1004 and processor 1002 may be packed together as a "processor module," with processor 1002 being referred to as the "processor core." Furthermore, certain embodiments of the present disclosure may not require nor include all of the above components. For example, the peripheral devices shown coupled to standard I/O bus 1008 may couple to high performance I/O bus 1006, In addition, in some embodiments, only a single bus may exist, with the components of hardware system 1000 being coupled to the single bus. Furthermore, hardware system 1000 may include additional components, such as additional processors, storage devices, or memories.

An operating system manages and controls the operation of hardware system 1000, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Of course, other embodiments are possible. For example, the functions described herein may be implemented in firmware or on an application-specific integrated circuit.

Furthermore, the above-described elements and operations can be comprised of instructions that are stored on non-transitory storage media. The instructions can be retrieved and executed by a processing system. Some examples of instructions are software, program code, and firmware. Some examples of non-transitory storage media are memory devices, tape, disks, integrated circuits, and servers. The instructions are operational when executed by the processing system to direct the processing system to operate in accord with the disclosure. The term "processing system" refers to a single processing device or a group of inter-operational processing devices. Some examples of processing devices are integrated circuits and logic circuitry. Those skilled in the art are familiar with instructions, computers, and storage media.

One or more features from any embodiment may be combined with one or more features of any other embodiment without departing from the scope of the disclosure. A recitation of "a," "an," or "the" is intended to mean "one or more" unless specifically indicated to the contrary. In addition, it is to be understood that functional operations, such as "awarding," "locating," "permitting," and the like, are executed by game application logic that accesses, and/or causes changes to, various data attribute values maintained in a database or other memory.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

For example, the methods, game features and game mechanics described herein may be implemented using hardware components, software components, and/or any combination thereof. By way of example, while embodiments of the present disclosure have been described as operating in connection with a networking website, various embodiments of the present disclosure can be used in connection with any communications facility that supports web applications. Furthermore, in some embodiments the term "web service" and "website" may be used interchangeably and may additionally refer to a custom or generalized API (Application Programming Interface) on a device, such as a mobile device (e.g., cellular phone, smart phone, personal GPS (Global Positioning System), PDA, personal gaming device, and the like), that makes API calls directly to a server. Still further, while the embodiments described above operate with business-related virtual objects (such as stores and restaurants), the described systems and methods can be applied to any in-game asset around which a harvest mechanic is implemented, such as a virtual stove, a plot of land, and the like. The specification and drawings are, accordingly, to be regarded in an illustrative rather than a restrictive sense. It will, however, be evident that various modifications and changes may be made thereunto without departing from the broader spirit and scope of the disclosure as set forth in the claims and that the disclosure is intended to cover all modifications and equivalents within the scope of the following claims.

Thus, methods and systems for transferring assets between games have been described. Although the methods and systems have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

In the foregoing description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the description, with each claim standing on its own as a separate embodiment.

What is claimed is:

1. A computer-implemented method, comprising:
   at an online game server, in response to determining that a first user account associated with a first mobile device has reached a predefined game metric in a first online game:
   identifying, in a game asset inventory of a second online game being played by a second user account, at least one in-game asset that corresponds with more game features in the first online game than with game features in the second online game, the second user account associated with a second mobile device, the first and the second online games being different games provided by the online game server;

causing generation on the first mobile device, in a game user interface for the first online game, of a graphical representation of a delivery mechanism delivering the at least one in-game asset to the first online game when the first user account is logged into a session of the first online game; and causing generation on the second mobile device, in a game user interface for the second online game, of a removal mechanism removing the at least one in-game asset from the second online game when the second user account is logged into a session of the second online game, wherein the graphical representation of the removal mechanism correspond in a visual appearance to the graphical representation of the delivery mechanism.

2. The computer-implemented method of claim 1, further comprising:

after receiving a request from the first mobile device to establish a first current session of the first online game, rendering the graphical representation of the delivery mechanism in the game user interface of the first online game displayed at the first mobile device during the first current session; and after receiving a request from the second mobile device to establish a second current session of the second online game, rendering the graphical representation of the removal mechanism in the game user interface of the second online game displayed at the second mobile device during the second current session.

3. The computer-implemented method of claim 2, wherein at least a portion of the first current session and at least a portion of the second current portion occur simultaneously.

4. The computer-implemented method of claim 2, wherein no portion of the first current session and no portion of the second current portion occur simultaneously.

5. The computer-implemented method of claim 1, wherein the first online game and the second online game comprise respective different versions of a common type of online game.

6. The computer-implemented method of claim 1, wherein the first online game comprises a different type of online game than the second online game.

7. A non-transitory computer-readable medium storing executable instructions thereon, which, when executed by a processor, cause the processor to perform operations including:

at an online game server in response to determining that a first user account associated with a first mobile device has reached a predefined game metric in a first online game:

identifying, in a game asset inventory of a second online game being played by a second user account, at least one in-game asset that corresponds with more game features in the first online game than with game features in the second online game, the second user account associated with a second mobile device, the first and the second online games being different games provided by the online game server;

causing generation on the first mobile device, in a game user interface for the first online game, of a graphical representation of a delivery mechanism delivering the at least one in-game asset to the first online game when the first user account is logged into a session of the first online game; and causing generation on the second mobile device, in a game user interface for the second online game, of a removal mechanism removing the at least one in-game asset from the second online game when the second user account is logged into a session of the second online game, wherein the graphical representation of the removal mechanism correspond in a visual appearance to the graphical representation of the delivery mechanism.

8. The non-transitory computer-readable medium of claim 7, further comprising:

after receiving a request from the first mobile device to establish a first current session of the first online game, rendering the graphical representation of the delivery mechanism in the game user interface of the first online game displayed at the first mobile device during the first current session; and after receiving a request from the second mobile device to establish a second current session of the second online game, rendering the graphical representation of the removal mechanism in the game user interface of the second online game displayed at the second mobile device during the second current session.

9. The non-transitory computer-readable medium of claim 8, wherein at least a portion of the first current session and at least a portion of the second current portion occur simultaneously.

10. The non-transitory computer-readable medium of claim 8, wherein no portion of the first current session and no portion of the second current portion occur simultaneously.

11. The non-transitory computer-readable medium of claim 7, wherein the first online game and the second online game comprise respective different versions of a common type of online game.

12. The non-transitory computer-readable medium of claim 7, wherein the first online game comprises a different type of online game than the second online game.

13. A computer system comprising:

a processor;

a memory device holding an instruction set executable on the processor to cause the computer system to perform operations comprising:

at an online game server, in response to determining that a first user account associated with a first mobile device has reached a predefined game metric in a first online game:

identifying, in a game asset inventory of a second online game being played by a second user account, at least one in-game asset that corresponds with more game features in the first online game than with game features in the second online game, the second user account associated with a second mobile device, the first and the second online games being different games provided by the online game server;

causing generation on the first mobile device, in a game user interface for the first online game, of a graphical representation of a delivery mechanism delivering the at least one in-game asset to the first online game when the first user account is logged into a session of the first online game; and causing generation on the second mobile device, in a game user interface for the second online game, of a removal mechanism removing the at least one in-game asset from the second online game when the second user account is logged into a session of the second online game, wherein the graphical representation of the removal mechanism correspond in a visual appearance to the graphical representation of the delivery mechanism.

14. The computer system of claim 13, further comprising:
after receiving a request from the first mobile device to establish a first current session of the first online game, rendering the graphical representation of the delivery mechanism in the game user interface of the first online game displayed at the first mobile device during the first current session; and
after receiving a request from the second mobile device to establish a second current session of the second online game, rendering the graphical representation of the removal mechanism in the game user interface of the second online game displayed at the second mobile device during the second current session.

15. The computer system of claim 14, wherein at least a portion of the first current session and at least a portion of the second current portion occur simultaneously.

16. The computer system of claim 14, wherein no portion of the first current session and no portion of the second current portion occur simultaneously.

* * * * *